United States Patent
Ishii et al.

(10) Patent No.: US 6,529,448 B1
(45) Date of Patent: Mar. 4, 2003

(54) HIGH SPEED MAGNETIC COIL FOR MAGNETO-OPTICAL HEAD

(75) Inventors: Kazuyoshi Ishii, Tokyo (JP); Kozo Yoshida, Fuji (JP)

(73) Assignees: Canon Kabushiki Kaisha, Tokyo (JP); Asahi Kasei Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/674,433

(22) PCT Filed: Apr. 30, 1999

(86) PCT No.: PCT/JP99/02317
§ 371 (c)(1),
(2), (4) Date: Nov. 1, 2000

(87) PCT Pub. No.: WO99/57717
PCT Pub. Date: Nov. 11, 1999

(30) Foreign Application Priority Data

May 7, 1998 (JP) .......................... 10-124734
Mar. 19, 1999 (JP) .......................... 11-075275

(51) Int. Cl.$^7$ .............................................. G11B 11/00
(52) U.S. Cl. .................................. 369/13.23; 369/13.17
(58) Field of Search ......................... 369/13.23, 13.22, 369/13.17, 13.18, 13.19, 13.2, 13.21

(56) References Cited

U.S. PATENT DOCUMENTS

| | | | |
|---|---|---|---|
| 5,377,055 A | 12/1994 | Ishii | 360/59 |
| 5,448,538 A | * 9/1995 | Aratani et al. | 369/13 |
| 5,485,433 A | 1/1996 | Satomura et al. | 369/13 |
| 5,523,986 A | 6/1996 | Ishii | 369/13 |
| 5,550,796 A | 8/1996 | Ishii | 369/13 |
| 5,559,763 A | 9/1996 | Ishii | 369/13 |
| 5,563,853 A | 10/1996 | Ishii | 369/13 |
| 5,579,293 A | 11/1996 | Ishii | 369/13 |
| 5,586,091 A | 12/1996 | Ishii et al. | 369/13 |
| 5,615,183 A | 3/1997 | Ishii | 369/13 |
| 5,661,612 A | 8/1997 | Hasegawa et al. | 360/59 |
| 5,687,141 A | 11/1997 | Ishii | 369/13 |
| 5,689,478 A | 11/1997 | Ishii et al. | 369/13 |
| 5,703,839 A | 12/1997 | Ishii | 369/13 |
| 5,986,976 A | 11/1999 | Ishii | 369/13 |
| 5,991,242 A | 11/1999 | Ishii | 369/13 |
| 6,041,024 A | 3/2000 | Ishii | 369/13 |
| 6,314,060 B1 | * 11/2001 | Ishii | 369/13 |

FOREIGN PATENT DOCUMENTS

| | | |
|---|---|---|
| JP | 4-74335 | 3/1992 |
| JP | 6-309607 | 11/1994 |
| JP | 8-63824 | 3/1996 |

* cited by examiner

*Primary Examiner*—Tan Dinh
(74) *Attorney, Agent, or Firm*—Fitzpatrick, Cella, Harper & Scinto

(57) ABSTRACT

In a flat magnetic head coil constituted by spiral coil patterns made of a conductive material film and two terminals connected to the coil patterns, the coil patterns have a substantially rectangular sectional shape. A minimum pitch P [$\mu$m] of the coil pattern, a width W [$\mu$m] of the sectional shape at the minimum pitch P, and a height H [$\mu$m] satisfy 15 [$\mu$m]$\leq$P$\leq$70 [$\mu$m] and 1.8−0.012P$\leq$H/W$\leq$7.5−0.06P. When an impedance Z0 between the two terminals of the coil while a core made of a magnetic material is not attached is equivalently constituted by an inductance L0, an RF resistance Rp0 parallel to the inductance L0, and a DC resistance Rs which is series-connected to the inductance L0 and is independent of a frequency, the inductance L0 [$\mu$H] at 10 MHz satisfies L0$\leq$0.85 [$\mu$H].

41 Claims, 7 Drawing Sheets

HIGH SPEED MAGNETIC COIL FOR MAGNETO-OPTICAL HEAD

TECHNICAL FIELD

The present invention relates to a magneto-optical recording apparatus for recording an information signal on a magneto-optical recording medium on which an information signal is recorded by a magnetic field modulation recording method, a magnetic head used for the magneto-optical recording apparatus, and a magnetic head coil used for the magnetic head.

BACKGROUND ART

A conventionally known example of magneto-optical recording apparatuses for recording information signals at high density on a magneto-optical recording medium such as a magneto-optical disk adopts a magnetic field modulation method. The apparatus of this type comprises optical and magnetic heads. The optical head converges a laser beam into a small light spot to irradiate the magnetic recording layer of a magneto-optical recording medium. The magnetic head vertically applies a magnetic field modulated by an information signal to the laser beam irradiated portion of the magneto-optical recording medium, thereby recording the information signal on the magneto-optical recording medium.

This conventional magneto-optical recording apparatus uses a magnetic head having an arrangement as disclosed in, e.g., Japanese Patent Application Laid-open No. 6-309607. FIG. 9 is a sectional view showing the structure of this conventional magnetic head.

Reference numeral 50 denotes a core made of a magnetic material such as ferrite; and 51, a coil formed by winding a magnetic wire (thin electric wire prepared by forming an insulating film of polyurethane or the like on a conductive wire made of a conductive material such as copper) on a magnetic pole p3 of the core. By supplying a current to the coil 51, a magnetic field is generated from the end face of the magnetic pole p3 of the core 50, and vertically applied to a magneto-optical recording medium.

In recent years, demands have arisen for high-speed recording of an information signal. Along with this, the modulation frequency of the magnetic field must be increased. However, when the coil is formed from a magnetic wire, like the conventional magnetic head, the sectional shape and size of a manufacturable conductive wire are limited and cannot be arbitrarily set. If the diameter of the conductive wire forming the magnetic wire is set to 50 $\mu$m or less to downsize the coil, the magnetic wire is difficult to align vertically and horizontally, as shown in FIG. 9, so as to constitute the coil. This results in irregular turns of the disordered winding. For this reason, the coil diameter is inevitably large. For a vertically elongated coil shape, as shown in FIG. 9, the coil inductance increases so as to decrease the magnetic field generation efficiency of the magnetic head. However, a thin magnetic wire made of a conductive wire 50 $\mu$m or less in diameter is very difficult to manufacture not as a vertically elongated coil but as a flat coil with a low inductance. To increase the modulation frequency of the magnetic field, a high drive voltage proportional to the modulation frequency or coil inductance must be applied to the magnetic head coil, which increases the power consumption of the magneto-optical recording apparatus. In addition, the RF resistance of the coil caused by the skin and proximity effects of the magnetic wire cannot be satisfactorily reduced. The RF loss of the magnetic head increases, heat generated by the magnetic head degrades the magnetic characteristics of the magnetic head, and a magnetic field of a desired strength is difficult to generate. This problem becomes serious at a maximum magnetic field modulation frequency of 8 MHz or more.

DISCLOSURE OF INVENTION

According to the present invention, a flat magnetic head coil constituted by spiral coil patterns made of a conductive material film and two terminals connected to the coil patterns is characterized in that the coil patterns have a substantially rectangular sectional shape, a minimum pitch P [$\mu$m] of the coil pattern, a width W [$\mu$m] of the sectional shape at the minimum pitch P, and a height H [$\mu$m] satisfy inequalities (10) and (11):

$$15\ [\mu m] \leq P \leq 70\ [\mu m] \quad (10)$$

$$1.85 - 0.012P \leq H/W \leq 7.5 - 0.06P \quad (11)$$

when an impedance Z0 between the two terminals of the coil while at least a core made of a magnetic material is not attached is regarded to be equivalently constituted by an inductance L0, an RF resistance Rp0 parallel to the inductance L0, and a DC resistance Rs which is series-connected to the inductance L0 and is independent of a frequency, the inductance L0 [$\mu$H] at 10 MHz satisfies inequality (5):

$$L0 \leq 0.85\ [\mu H] \quad (5)$$

The magnetic head coil is characterized in that the inductance L0 [$\mu$H] at 10 MHz, and the RF resistance Rp0 [$\Omega$] at 20 MHz and the DC resistance Rs [$\Omega$] satisfy inequalities (6) and (8):

$$Rp0 \geq L0 \times 1500 \quad (6)$$

$$Rs \leq 2 \quad (8)$$

The magnetic head coil is characterized in that the inductance L0 [$\mu$H] at 10 MHz, and the RF resistance Rp0 [$\Omega$] at 20 MHz satisfy inequality (7):

$$Rp0 \geq L0 \times 2000 \quad (7)$$

The magnetic head coil is characterized in that at least one of the coil patterns is formed on a lower surface side of the magnetic head coil facing a magneto-optical recording medium, and an interval Tb [$\mu$m] between the coil patterns, an interval Tc [$\mu$m] between an end face of the coil pattern formed on the lower surface side and a lower surface of the magnetic head coil, and a thickness T [$\mu$m] of the magnetic head coil satisfy inequalities (13), (14), and (15):

$$2\ [\mu m] \leq Tb \leq 70\ [\mu m] \quad (13)$$

$$Tc \leq 1.5H \quad (14)$$

$$50\ [\mu m] \leq T \leq 450\ [\mu m] \quad (15)$$

The magnetic head coil is characterized in that a total number N of turns of the coil patterns, a minimum radius r1 [mm] of an innermost periphery of the coil pattern, and a maximum radius r2 [mm] of an outermost periphery satisfy inequalities (16), (17), and (18):

$$14 \leq N \leq 40 \quad (16)$$

$$r1 \leq 0.2\ [mm] \quad (17)$$

$$r2 \leq 1.1\ [mm] \quad (18)$$

According to the present invention, a flat magnetic head coil constituted by spiral coil patterns made of a conductive material film and two terminals connected to the coil patterns is characterized in that a light-transmitting portion is formed at a center of the coil, the coil patterns have a substantially rectangular sectional shape, a minimum pitch P [μm] of the coil pattern, a width W [μm] of the sectional shape at the minimum pitch P, and a height H [μm] satisfy inequalities (29) and (30):

$$15\ [\mu m] \leq P \leq 50\ [\mu m] \tag{29}$$

$$1.85 - 0.012P \leq H/W \leq 7.5 - 0.06P \tag{30}$$

when an impedance Z0 between the two terminals of the coil while at least a core made of a magnetic material is not attached is regarded to be equivalently constituted by an inductance L0, an RF resistance Rp0 parallel to the inductance L0, and a DC resistance Rs which is series-connected to the inductance L0 and is independent of a frequency, the inductance L0 [μH] at 10 MHz satisfies inequality (24):

$$L0 \leq 1.4\ [\mu H] \tag{24}$$

The magnetic head coil is characterized in that the inductance L0 [μH] at 10 MHz, and the RF resistance Rp0 [Ω] at 20 MHz and the DC resistance Rs [Ω] satisfy inequalities (25) and (27):

$$Rp0 \geq L0 \times 1200 \tag{25}$$

$$Rs \leq 6\ [\Omega] \tag{27}$$

The magnetic head coil is characterized in that the inductance L0 [μH] at 10 MHz, and the RF resistance Rp0 [Ω] at 20 MHz satisfy inequality (26):

$$Rp0 \geq L0 \times 1500 \tag{26}$$

The magnetic head coil is characterized in that at least one of the coil patterns is formed on a lower surface side of the magnetic head coil facing a magneto-optical recording medium, and an interval Tb [μm] between the coil patterns, an interval Tc [μm] between an end face of the coil pattern formed on the lower surface side and a lower surface of the magnetic head coil, and a thickness T [μm] of the magnetic head coil satisfy inequalities (32), (33), and (34):

$$2\ [\mu m] \leq Tb \leq 70\ [\mu m] \tag{32}$$

$$Tc \leq 1.5H \tag{33}$$

$$30\ [\mu m] \leq T \leq 300\ [\mu m] \tag{34}$$

The magnetic head coil is characterized in that a total number N of turns of the coil patterns, a minimum radius r1 [mm] of an innermost periphery of the coil pattern, and a maximum radius r2 [mm] of an outermost periphery satisfy inequalities (35), (36), and (37):

$$20 \leq N \leq 70 \tag{35}$$

$$r1 \leq 0.13\ [mm] \tag{36}$$

$$r2 \leq 1.0\ [mm] \tag{37}$$

The magnetic head coil is characterized in that when at least a core made of a magnetic material is not attached, a self-resonance frequency fr0 [MHz] which maximizes an impedance magnitude |Z0| of the coil, and the inductance L0 [μH] at 10 MHz satisfy inequality (9):

$$fr0 \geq 1/(2\pi \sqrt{L0 \times 1.4 \times 10^{-6}}) \tag{9}$$

The magnetic head coil is characterized in that two to four coil patterns are formed.

The magnetic head coil is characterized in that the pitch P [μm] and the width W [μm] on the coil pattern satisfy inequality (12):

$$0.55 \leq W/P \leq 0.8 \tag{12}$$

According to the present invention, a magnetic head having a core made of a magnetic material and a flat coil is characterized in that the coil is constituted by spiral coil patterns made of a conductive material film and two terminals connected to the coil patterns, the coil patterns have a substantially rectangular sectional shape, a minimum pitch P [μm] of the coil pattern, a width W [μm] of the sectional shape at the minimum pitch P, and a height H [μm] satisfy inequalities (10) and (11):

$$15\ [\mu m] \leq P \leq 70\ [\mu m] \tag{10}$$

$$1.85 - 0.012P \leq H/W \leq 7.5 - 0.06P \tag{11}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance Li [μH] at 10 MHz satisfies inequality (1):

$$L1 \leq 1.4\ [\mu H] \tag{1}$$

The magnetic head is characterized in that the inductance L1 [μH] at 10 MHz, and the RF resistance Rp1 [Ω] at 20 MHz and the DC resistance Rs [Ω] satisfy inequalities (2) and (8):

$$Rp1 \geq L1 \times 1500 \tag{2}$$

$$Rs \leq 2\ [\Omega] \tag{8}$$

The magnetic head is characterized in that the inductance L1 [μH] at 10 MHz, and the RF resistance Rp1 [Ω] at 20 MHz satisfy inequality (3):

$$Rp1 \geq L1 \times 2000 \tag{3}$$

The magnetic head is characterized in that at least one of the coil patterns is formed on a lower surface side of the coil facing a magneto-optical recording medium, and an interval Tb [μm] between the coil patterns, an interval Tc [μm] between an end face of the coil pattern formed on the lower surface side and a lower surface of the coil, and a thickness T [μm] of the coil satisfy inequalities (13), (14), and (15):

$$2\ [\mu m] \leq Tb \leq 70\ [\mu m] \tag{13}$$

$$Tc \leq 1.5H \tag{14}$$

$$50\ [\mu m] \leq T \leq 450\ [\mu m] \tag{15}$$

The magnetic head is characterized in that a total number N of turns of the coil patterns, a minimum radius r1 [mm] of an innermost periphery of the coil pattern, and a maximum radius r2 [mm] of an outermost periphery satisfy inequalities (16), (17), and (18):

$$14 \leq N \leq 40 \tag{16}$$

$$r1 \leq 0.2\ [mm] \tag{17}$$

$$r2 \leq 1.1\ [mm] \tag{18}$$

The magnetic head is characterized in that the magnetic head has a sliding surface for sliding on a magneto-optical recording medium or a floating surface for floating and gliding, and an interval d [μm] between a lower surface of the coil facing the magneto-optical recording medium and a lowest point of the sliding surface or the floating surface satisfies inequality (19):

$$d \leq 200 \, [\mu m] \tag{19}$$

According to the present invention, a magnetic head having a flat coil is characterized in that the coil is constituted by spiral coil patterns made of a conductive material film and two terminals connected to the coil patterns, a light-transmitting portion is formed at a center of the coil, the coil patterns have a substantially rectangular sectional shape, a minimum pitch P [μm] of the coil pattern, a width W [μm] of the sectional shape at the minimum pitch P, and a height H [μm] satisfy inequalities (29) and (30):

$$15 \, [\mu m] \leq P \leq 50 \, [\mu m] \tag{29}$$

$$1.85 - 0.012P \leq H/W \leq 7.5 - 0.06P \tag{30}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (20):

$$L1 \leq 1.4 \, [\mu H] \tag{20}$$

The magnetic head is characterized in that the inductance L1 [μH] at 10 MHz, and the RF resistance Rp1 [Ω] at 20 MHz and the DC resistance Rs [Ω] satisfy inequalities (21) and (27):

$$Rp1 \geq L1 \times 1200 \tag{21}$$

$$Rs \leq 6 \, [\Omega] \tag{27}$$

The magnetic head is characterized in that the inductance L1 [μH] at 10 MHz, and the RF resistance Rp1 [Ω] at 20 MHz satisfy inequality (22):

$$Rp1 \geq L1 \times 1500 \tag{22}$$

The magnetic head is characterized in that at least one of the coil patterns is formed on a lower surface side of the coil facing a magneto-optical recording medium, and an interval Tb [μm] between the coil patterns, an interval Tc [μm] between an end face of the coil pattern formed on the lower surface side and a lower surface of the coil, and a thickness T [μm] of the coil satisfy inequalities (32), (33), and (34):

$$2 \, [\mu m] \leq Tb \leq 70 \, [\mu m] \tag{32}$$

$$Tc \leq 1.5H \tag{33}$$

$$30 \, [\mu m] \leq T \leq 300 \, [\mu m] \tag{34}$$

The magnetic head is characterized in that a total number N of turns of the coil patterns, a minimum radius r1 [mm] of an innermost periphery of the coil pattern, and a maximum radius r2 [mm] of an outermost periphery satisfy inequalities (35), (36), and (37):

$$20 \leq N \leq 70 \tag{35}$$

$$r1 \leq 0.13 \, [mm] \tag{36}$$

$$r2 \leq 1.0 \, [mm] \tag{37}$$

The magnetic head is characterized in that the magnetic head has a sliding surface for sliding on a magneto-optical recording medium or a floating surface for floating and gliding, and an interval d [μm] between a lower surface of the coil facing the magneto-optical recording medium and a lowest point of the sliding surface or the floating surface satisfies inequality (38):

$$d \leq 100 \, [\mu m] \tag{38}$$

The magnetic head is characterized in that a self-resonance frequency fr1 [MHz] which maximizes an impedance magnitude |Z1| of the coil, and the inductance L1 [μH] at 10 MHz satisfy inequality (4):

$$fr1 \geq 1/(2\pi \sqrt{L1 \times 1.4 \times 10^{-6}}) \tag{4}$$

The magnetic head is characterized in that two to four coil patterns are formed.

The magnetic head is characterized in that the pitch P [μm] and the width W [μm] on the coil pattern satisfy inequality (12):

$$0.55 \leq W/P \leq 0.8 \tag{12}$$

The magnetic head according to the present invention is characterized by further comprising a lens.

According to the present invention, a magneto-optical recording apparatus having an optical head for irradiating a magneto-optical recording medium with light, and a magnetic head for applying a magnetic field modulated by an information signal to the magneto-optical recording medium is characterized in that the magnetic head is a magnetic head having some of the above features.

Using the magnetic head coil, magnetic head, and magneto-optical recording apparatus according to the present invention can solve the above-described problem in the conventional apparatus.

BEST MODE OF CARRYING OUT THE INVENTION

Embodiments of a magnetic head coil, magnetic head, and magneto-optical recording apparatus according to the present invention will be described in detail.

[First Embodiment]

Figure 1:
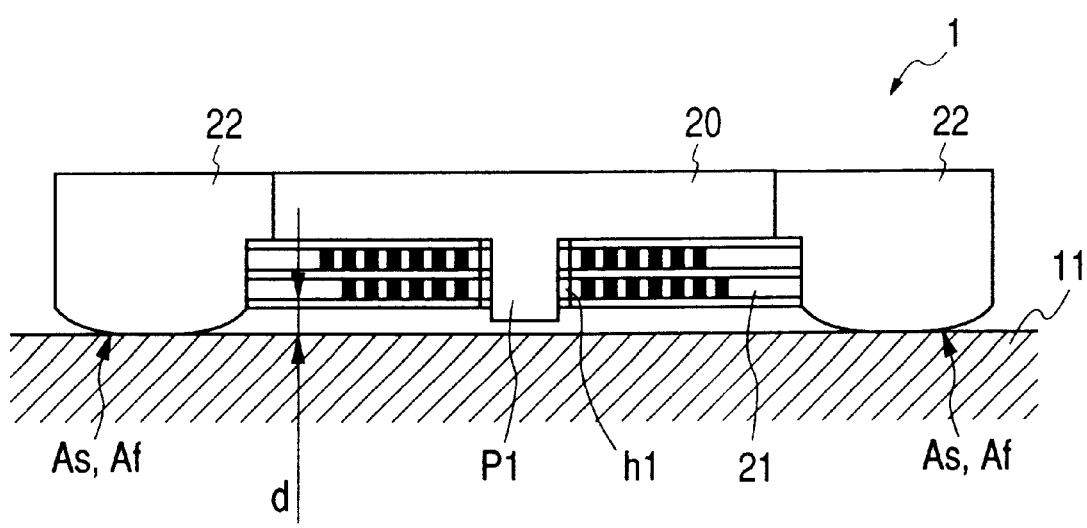
FIG. 1 is a side sectional view showing the structure of a magnetic head according to the first embodiment of the invention.
Figure 3:
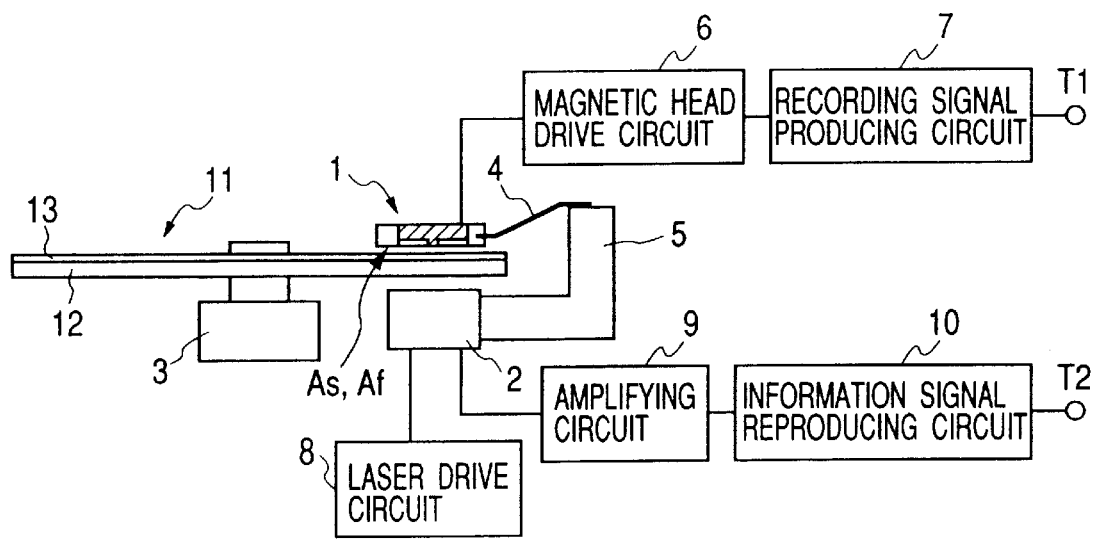
FIG. 3 is a block diagram showing the schematic arrangement of a magneto-optical recording apparatus according to the first embodiment of the present invention.

FIG. 1 is a side sectional view showing the structure of a magnetic head 1 according to the first embodiment of the invention. FIG. 3 shows the schematic arrangement of a magneto-optical recording apparatus according to the first embodiment of the present invention.

As shown in FIG. 1, the magnetic head 1 is constituted by a core 20, a coil 21, and a slider 22 which mounts them. Reference numeral 11 denotes a magneto-optical disk serving as a magneto-optical recording medium for recording an information signal. The slider 22 is made of a resin material or ceramic excellent in lubricity and wear resistance. The lower surface of the slider 22 facing the magneto-optical disk 11 serves as a sliding surface As for sliding on the magneto-optical disk 11 or a floating surface Af for floating and gliding on the magneto-optical disk 11. FIG. 1 shows a state in which the magnetic head 1 slides on the magneto-optical disk 11. The core 20 is made of a soft magnetic material such as ferrite with a square plate shape. A projecting magnetic pole p1 having a prism shape stands at the center of the core 20 so as to substantially vertically face the surface of the magneto-optical disk 11. The end face of the magnetic pole p1 has a square shape about 50 to 200 $\mu$m on one side. The coil 21 is flat, and its center has a hole h1. The coil 21 is attached to the lower surface of the core 20 so as to be almost parallel to the surface of the magneto-optical disk 11. The magnetic pole p1 of the core 20 projects by about 50 $\mu$m from the lower surface of the coil 21 through the hole h1.

In FIG. 3, the magneto-optical disk 11 serves as a magneto-optical recording medium for recording an information signal, and is comprised of a substrate 12 formed from a transparent material and a magnetic recording layer 13 formed from a magnetic material on the substrate 12. The magneto-optical disk 11 is rotated by a spindle motor 3. The magnetic head 1 shown in FIG. 1 is arranged above the upper surface of the magneto-optical disk 11, whereas an optical head 2 is arranged below the lower surface so as to oppose the magnetic head 1.

The magnetic head 1 is held at the distal end of an elastic support member 4 such that the sliding surface As or floating surface Af faces the upper surface of the magneto-optical disk 11. The proximal end of the support member 4 is attached to a coupling member 5. The optical head 2 is attached to the coupling member 5 so as to face the lower surface of the magneto-optical disk 11. The magnetic and optical heads 1 and 2 are integrally conveyed by a convey means (not shown) to arbitrary positions along the radial direction of the magneto-optical disk 11.

The coil 21 of the magnetic head 1 is connected to a magnetic head drive circuit 6, which is connected to a recording signal producing circuit 7.

The optical head 2 is made up of a laser source, optical sensor, optical system, and the like. The laser source is connected to a laser drive circuit 8, and the optical sensor is connected to an amplifying circuit 9.

To record an information signal on the magneto-optical disk 11, the magneto-optical disk 11 is rotated by the spindle motor 3. Then, the magnetic head 1 slides on or floats/glides above the magneto-optical disk 11. The recording signal producing circuit 7 performs processing such as coding for an information signal input from an input terminal T1, produces a recording signal, and sends the signal to the magnetic head drive circuit 6. The magnetic head drive circuit 6 supplies a current modulated by the recording signal to the coil 21 of the magnetic head 1. The amplitude of the current supplied to the coil is ±70 mA to ±160 mA, and its maximum modulation frequency is 8 MHz or more.

A magnetic field modulated by the information signal is generated from the distal end of the magnetic pole p1 of the magnetic head 1, and vertically applied to the magnetic recording layer 13 of the magneto-optical disk 11. At the same time, the laser source of the optical head 2 emits a laser beam upon reception of a current from the laser drive circuit 8. The laser beam converges into a small light spot by the optical system to irradiate the magnetic field application region of the magnetic recording layer 13. As a result, a magnetized region whose magnetization direction changes in correspondence with a change in the direction of an applied magnetic field is formed on the magnetic recording layer 13, thereby recording the information signal.

To reproduce an information signal recorded in this manner, the optical head 2 irradiates the magnetic recording layer 13 with a laser beam of lower power than in recording while the magneto-optical disk 11 is rotated. The polarization plane of the laser beam reflected by the magnetic recording layer 13 rotates in correspondence with the magnetization direction of the magnetized region formed on the magnetic recording layer 13. This is detected by the optical sensor of the optical head 2, and the detection signal is amplified by the amplifying circuit 9. An information signal is reproduced from the detection signal amplified by an information signal reproducing circuit 10, and is output from an output terminal T2.

Figure 2A:
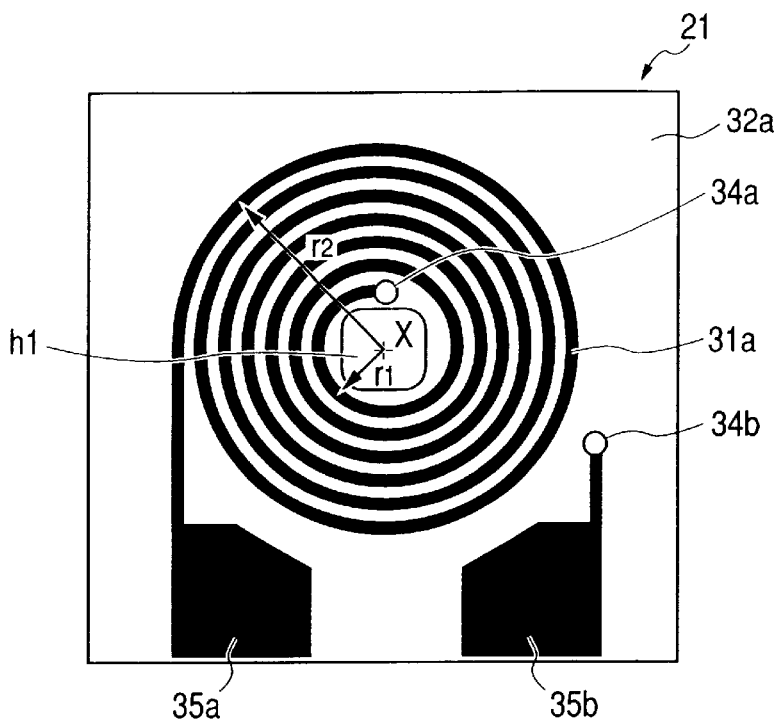
FIGS. 2A, 2B, and 2C are views showing the structure of a magnetic head coil according to the present invention.
Figure 2B:
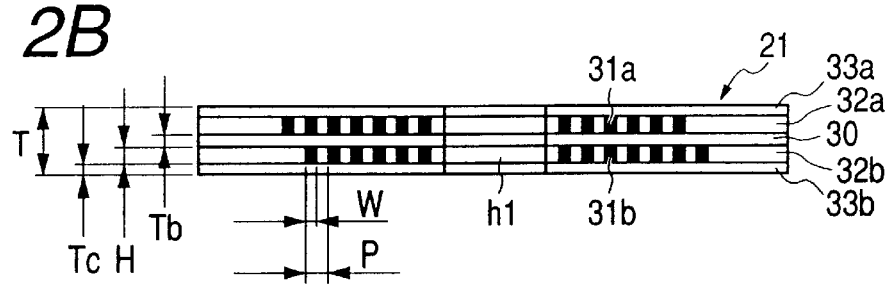
Figure 2C:
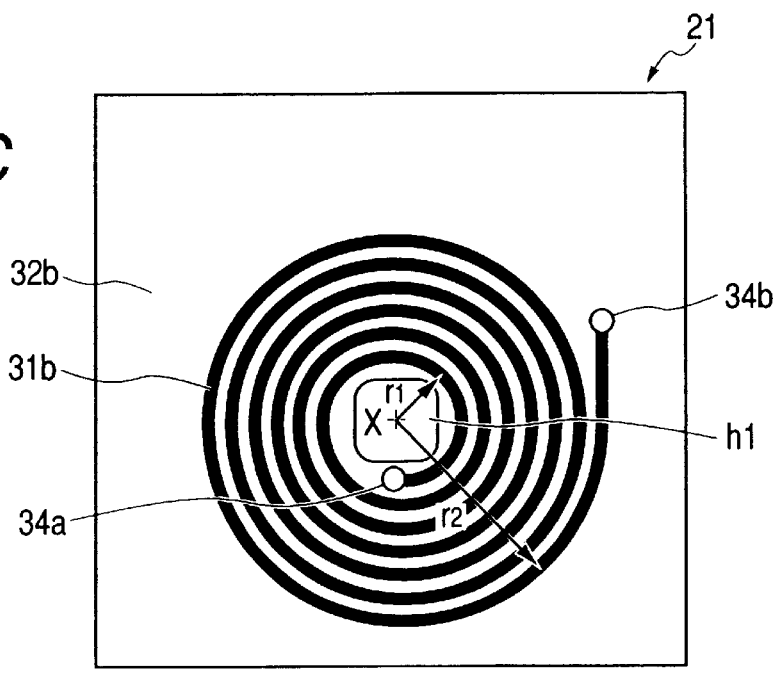

FIGS. 2A to 2C show the structure of the coil 21. FIG. 2A is a view when viewed from the top, FIG. 2B is a side sectional view, and FIG. 2C is a view when viewed from the bottom.

The coil 21 is constituted by a base 30 as a thin plate made of a nonconductive material, e.g., a resin material, a coil pattern 31a made of a conductive material film such as a copper film, an insulating member 32a made of a nonconductive material film such as a photosensitive resin material film, a protection coat 33a covering the coil pattern 31a, which pattern 31a, member 32a, and coat 33a are formed on a side (upper surface side) of the base 30 facing the core 20, a coil pattern 31b made of a conductive material film such as a copper film, an insulating member 32b made of a nonconductive material film such as a photosensitive resin material film, and a protection coat 33b covering the coil pattern 31b, which pattern 31b, member 32b, and coat 33b are formed on a side (lower surface side) of the base 30 facing the magneto-optical disk 11.

The hole h1 as a magnetic pole arrangement portion is formed in the center of the coil 21. The coil patterns 31a and 31b are spirally formed around the hole h1.

The inner peripheral portions of the coil patterns 31a and 31b are connected through a connecting portion 34a such as a through hole formed near the hole h1. To connect the coil patterns 31a and 31b to the magnetic head drive circuit 6 via a current relay member such as a lead in order to supply a current, first and second terminals 35a and 35b are formed on the upper surface side of the coil 21. The outer peripheral portion of the coil pattern 31a is connected to the first terminal 35a, and that of the coil pattern 31b is connected to the second terminal 35b via a connecting portion 34b. The coil patterns 31a and 31b are series-connected between the first and second terminals 35a and 35b. A current is supplied from the first and second terminals 35a and 35b to the coil patterns 31a and 31b to generate a magnetic field from the end face of the magnetic pole p1. The magnetic field is vertically applied to the magneto-optical disk 11.

An impedance Z1 between the first and second terminals 35a and 35b of the coil 21 in the magnetic head 1 having the core 20 made of a soft magnetic material as shown in FIG.

Figure 6:
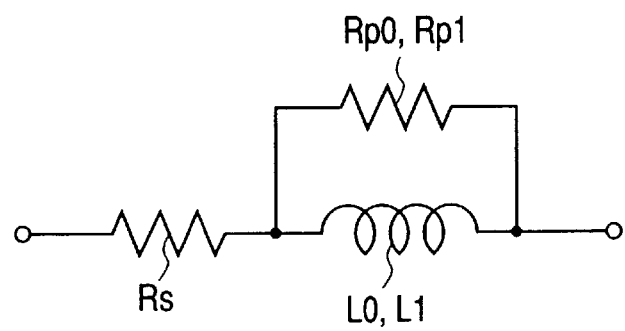
FIG. 6 is a circuit diagram showing the equivalent circuit of the coil.

1 can be equivalently expressed by an equivalent circuit constituted by an inductance L1, an RF resistance Rp1 parallel to the inductance L1, and a DC resistance Rs which is series-connected to the inductance L1 and is independent of the frequency, as shown in FIG. 6. Also, an impedance Z0 between the first and second terminals 35a and 35b of (only) the coil 21 to which at least the core 20 is not attached can be equivalently expressed by an equivalent circuit constituted by an inductance L0, an RF resistance Rp0 parallel to the inductance L0, and a DC resistance Rs which is series-connected to the inductance L0 and is independent of the frequency, as shown in FIG. 6.

The inductance L1 associates with the modulation frequency of the supply current to the coil 21, the drive voltage, and the like. The RF resistance Rp1 associates with the modulation frequency of the supply current to the coil 21, the AC power loss in the magnetic head 1, and the like. The DC resistance Rs associates with the drive voltage applied to the coil 21, the DC power loss in the magnetic head 1, and the like. Considering them, to increase the modulation frequency without increasing the drive voltage of the coil 21, and reduce the DC and AC power losses in the magnetic head 1, the electrical characteristics of the coil 21 are evaluated by the inductance L1, RF resistance Rp1, and DC resistance Rs, which must be made to fall within their desirable ranges.

When the core 20 is attached, the core 20 magnetizes to generate a magnetic flux, and thus the inductance L1 of the coil 21 becomes higher than the inductance L0 in a state in which the core 20 is not attached (only the coil 21). The RF resistance Rp0 of only the coil 21 is mainly generated under the influences of the proximity and skin effects on the coil pattern. When the core 20 is attached, the RF resistance Rp1 is further influenced by the RF loss in the core 20. In this way, the electrical characteristics of the coil 21 when the core 20 is attached are influenced by not only the coil 21 but also the core 20. Hence, to attain desirable electrical characteristics of the coil 21, the electrical characteristics of the coil 21 are evaluated when the core 20 made of a magnetic material is not attached, and are further evaluated after the core 20 is attached. Note that the DC resistance Rs is irrelevant to attachment/detachment of the core 20. The AC power loss of the magnetic head is inversely proportional to the RF resistance Rp1 or Rp0 of the coil 21, so that the values Rp0 and Rp1 are desirably as large as possible.

In particular, for a high modulation frequency, the electrostatic capacitance between the first and second terminals 35a and 35b must be considered in addition to the inductances L0 and L1, RF resistances Rp0 and Rp1, and DC resistance Rs. Letting L0 and L1 be inductances of the coil 21 when the core 20 is not attached and is attached, and C be the electrostatic capacitance, a self-resonance frequency fr0 of the coil 21 when the core 20 is not attached is substantially given by $$1/(2\pi\sqrt{L0 \times C})$$

A self-resonance frequency fr1 of the coil 21 when the core 20 is attached is substantially given by $$1/(2\pi\sqrt{L1 \times C})$$

If the self-resonance frequencies fr0 and fr1 are low, the modulation frequency of the supply current to the coil 21 is difficult to increase. Thus, at least the self-resonance frequencies fr0 and fr1 are desirably much higher than the maximum modulation frequency of the supply current to the coil 21.

Desirable electrical characteristics of the coil 21 will be explained in detail. A drive voltage to be applied to the coil 21 in recording an information signal is proportional to the maximum modulation frequency of the supply current to the coil 21 and the inductance L1. To increase the modulation frequency without increasing the drive voltage, the inductance L1 must be reduced. For example, to set the maximum modulation frequency to 8 MHz or more, the inductance L1 [μH] desirably satisfies inequality (1):

$$L1 \leq 1.4 \, [\mu H] \qquad (1)$$

As the RF resistance Rp1 is higher, the AC power loss is smaller. Moreover, a current supplied to the magnetic head contains a frequency component exceeding the maximum modulation frequency as the current waveform approaches a rectangle. Therefore, to reduce the power consumption of the magnetic head, the RF resistance Rp1 [Ω] at a frequency of 20 MHz desirably satisfies inequality (2):

$$Rp1 \geq L1 \times 1500 \qquad (2)$$

The RF resistance Rp1 [Ω] more desirably satisfies inequality (3):

$$Rp1 \geq L \times 2000 \qquad (3)$$

If the electrostatic capacitance C between the first and second terminals 35a and 35b of the coil 21 is 1.4 [pF] or less, the frequency fr1 [MHz] which maximizes the impedance magnitude |Z1|, and the inductance L1 at 10 MHz satisfy inequality (4):

$$fr1 \geq 1/(2\pi\sqrt{L1 \times 1.4 \times 10^{-6}}) \qquad (4)$$

As a result, the self-resonance frequency fr1 of the coil 21 can be set much higher than the maximum modulation frequency.

The present inventor has made extensive studies to find that to satisfy inequalities (1) and (2) when the core having the projecting magnetic pole is attached, the electrical characteristics of the coil 21 (electrical characteristics of only the coil 21) when the core 20 is not attached, i.e., the inductance L0 [μH] and the RF resistance Rp0 [Ω] at a frequency of 20 MHz desirably satisfy inequalities (5) and (6) in correspondence with inequalities (1) and (2):

$$L0 \leq 0.85 \, [\mu H] \qquad (5)$$

$$Rp0 \geq L0 \times 1500 \qquad (6)$$

The RF resistance Rp0 [Ω] more desirably satisfies inequality (7):

$$Rp0 \geq L0 \times 2000 \qquad (7)$$

In addition, the frequency fr0 [MHz] which maximizes an impedance magnitude |Z0| of the coil 21, and the inductance L0 at 10 MHz satisfy inequality (9):

$$fr0 \geq 1/(2\pi\sqrt{L0 \times 1.4 \times 10^{-6}}) \qquad (9)$$

As the DC resistance Rs is lower, the DC power loss of the magnetic head is smaller. To reduce the power consumption of the magnetic head, the DC resistance Rs [Ω] desirably satisfies inequality (8) (regardless of attachment/detachment of the core 20):

$$Rs \leq 2 \, [\Omega] \qquad (8)$$

Note that the inductances L0 and L1 are values at a frequency of 10 MHz, and the RF resistances Rp0 and Rp1 are values at a frequency of 20 MHz. The inductances L0 and L1, DC resistance Rs, RF resistances Rp0 and Rp1, and self-resonance frequencies fr0 and fr1 are values measured between the first and second terminals 35a and 35b. If conductive members such as leads for supplying a current are connected to the first and second terminals 35a and 35b of the coil 21 in measurement, they influence measurement values. To prevent this, such conductive members must be disconnected from the first and second terminals 35a and 35b of the coil 21 in measurement.

More specifically, the inductances L0 and L1, DC resistance Rs, and RF resistances Rp0 and Rp1 can be measured by the following method. First, the DC resistance Rs between the first and second terminals 35a and 35b is measured using a resistance meter or the like. Then, the impedance Z0 or Z1 between the first and second terminals 35a and 35b is measured at a predetermined frequency using an impedance analyzer, e.g., a NETWORK/SPECTRUM ANALYZER 4195A available from HEWLETT PACKARD. The inductance L0 or L1 at 10 MHz and the RF resistance Rp0 or Rp1 at 20 MHz are calculated from the obtained measurement value of the impedance Z0 or Z1 and the previously measured DC resistance Rs. For example, if measurement values of the impedance Z0 at a frequency f are R0, X0 (note that Z0=R0+jX0, i.e., R0 is the real part of Z0, and X0 is the imaginary part of Z0), and ΔR0=R0−Rs, Rp0 and L0 are calculated by equations (39) and (40):

$$Rp0 = (\Delta R0^2 + X0^2)/\Delta R0 \quad (39)$$

$$L0 = (\Delta R0^2 + X0^2)/2\pi f X0 \quad (40)$$

Similarly, if measurement values of the impedance Z1 at the frequency f are R1, X1 (note that Z1=R1+jX1, i.e., R1 is the real part of Z1, and X1 is the imaginary part of Z1), and ΔR1=R1−Rs, Rp0 and L0 are calculated by equations (41) and (42):

$$Rp1 = (\Delta R1^2 + X1^2)/\Delta R1 \quad (41)$$

$$L1 = (\Delta R1^2 + X1^2)/2\pi f X1 \quad (42)$$

The frequency is swept using the impedance analyzer, and frequencies which maximize the impedance magnitudes |Z0| and |Z1| are specified and defined as the self-resonance frequencies fr0 and fr1.

The present inventor has further made studies on the electrical characteristics of the coil 21 to find that the coil 21 having desirable electrical characteristics that satisfy inequalities (5) to (9) can be implemented by a coil pattern having the following characteristics.

The coil 21 is made up of two to four flat spiral coil patterns which are formed with the same central axis and series-connected, i.e., the two coil patterns 31a and 31b in the first embodiment. If the number of coil patterns is one or five or more, it is difficult to sufficiently increase the magnetic field generation efficiency without increasing the inductance L0. Five or more coil patterns increase the coil thickness to increase the height of the magnetic pole p1 of the core 20, resulting in a large RF loss in the core 20. Three or four coil patterns may be formed by stacking. In this case, the manufacturing process becomes more complicated than in the first embodiment. By forming the same number of coil patterns on the upper and lower surface sides of the coil 21, the two surfaces of the coil 21 simultaneously expand/contract upon temperature changes in th e manufacture or use, which prevents deformation of the coil 21. It is, therefore, the most desirable to form single coil patterns on both the upper and lower surface sides of the coil 21, like the first embodiment.

The coil pattern has an almost rectangular sectional shape. P represents the pitch (minimum value if the pitch changes depending on the position) of the coil pattern; W, the width of the sectional shape at the minimum pitch P; and H, the height. r1 represents the minimum radius of the innermost periphery of the coil pattern (minimum value of the distance from a center X of the coil patterns 31a and 31b to the innermost periphery); and r2, the maximum radius of the outermost periphery of the coil pattern (maximum value of the distance from the center X of the coil patterns 31a and 31b to the outermost periphery). N represents the number of turns of the coil patterns (the total number of turns of the coil patterns 31a and 31b).

A smaller pitch P of the coil pattern can desirably decrease the inductance L0 of the coil 21. However, if the width W and height H also decrease with a decrease in pitch P, the sectional area of the coil pattern decreases to increase the DC resistance Rs of the coil pattern. In addition, the circumferential length (2W+2H) of the coil pattern decreases to undesirably reduce the RF resistance Rp0 owing to the skin effect. To the contrary, if an excessively large height H increases the coil thickness to decrease the magnetic field generation efficiency. As a result of increasing the electrostatic capacitance C, the self-resonance frequency fr0 decreases. This makes the manufacture difficult. Hence, the range of the height H (or H/W) must be properly selected as follows in accordance with the pitch P of the coil pattern. More specifically, to make the electrical characteristics of the coil 21 satisfy inequalities (5) to (9), the pitch P [μm], width W [μm], and height H [μm] of the coil pattern desirably satisfy inequalities (10) and (11):

$$15\ [\mu m] \leq P \leq 70\ [\mu m] \quad (10)$$

$$1.85 - 0.012P \leq H/W \leq 7.5 - 0.06P \quad (11)$$

A higher ratio W/P can decrease the DC resistance Rs of the coil. However, an excessively high ratio W/P decreases the RF resistance Rp0 owing to the proximity effect with an adjacent coil pattern. As a result of increasing the electrostatic capacitance C, the self-resonance frequency fr0 decreases. From this, W/P desirably satisfies inequality (12):

$$0.55 \leq W/P \leq 0.8 \quad (12)$$

To increase the magnetic field generation efficiency, an interval Tb between the coil patterns 31a and 31b, and an interval Tc (almost equal to the thickness of the protection coat 33b) between the end face of the coil pattern 31b formed on the lower surface of the coil 21 facing the magneto-optical disk 11 and the lower surface of the coil 21 (surface of the protection coat 33b) must be set sufficiently small. In addition, a total thickness T of the coil 21 must be set small, and the coil patterns 31a and 31b must be brought closer to the magneto-optical disk 11. However, an excessively small interval Tb decreases the RF resistance Rp0 or increases the electrostatic capacitance C due to the proximity effect between the coil patterns 31a and 31b, thereby decreasing the self-resonance frequency fr0. To prevent this, the interval Tb [μm], interval Tc [μm], and thickness T [μm] preferably satisfy inequalities (13), (14), and (15):

$$2\ [\mu m] \leq Tb \leq 70\ [\mu m] \quad (13)$$

$$Tc \leq 1.5H\ [\mu m] \quad (14)$$

$$50\ [\mu m] \leq T \leq 450\ [\mu m] \quad (15)$$

A smaller number N of turns of the coil patterns desirably decreases the inductance L0. However, the magnetic field generation efficiency decreases, and a current necessary for generating a magnetic field of a desired strength increases. Accordingly, the number N of turns must fall within an appropriate range given by inequality (16):

$$14 \leq N \leq 40 \tag{16}$$

A smaller minimum radius r1 of the innermost periphery of the coil pattern can increase the magnetic field generation efficiency, whereas a smaller maximum radius r2 of the outermost periphery of the coil pattern can decrease the inductance L0. Therefore, the minimum radius r1 [mm] of the innermost periphery and the maximum radius r2 [mm] of the outermost periphery desirably satisfy inequalities (17) and (18):

$$r1 \leq 0.2 \text{ [mm]} \tag{17}$$

$$r2 \leq 1.1 \text{ [mm]} \tag{18}$$

Several examples of the coil 21 in the first embodiment of the present invention will be described together with numerical data.

FIRST EXAMPLE

Coil patterns 31a and 31b are made from a copper film, and their pitch P, height H, and width W are set to 60 μm, 55 μm, and 37 μm, respectively. These numerical data satisfy inequalities (10), (11), and (12).

The interval Tb between the coil patterns 31a and 31b is set to 40 μm; the interval Tc (almost equal to the thickness of a protection coat 33b) between the end face of the coil pattern 31b and the lower surface of a coil 21 (surface of the protection coat 33b), to 20 μm; and the thickness T of the coil 21, to 190 μm. These numerical data satisfy inequalities (13), (14), and (15).

The number N of turns of the coil patterns is set to 28.5 (the number of turns of each of the coil patterns 31a and 31b is 14.25). This numerical data satisfies inequality (16).

The minimum radius r1 of the innermost periphery of the coil pattern is set to 0.12 mm; and the maximum radius r2 of the outermost periphery, to 1.00 mm. These numerical data satisfy inequalities (17) and (18).

The electrical characteristics of the coil 21 having these numerical data when no core 20 was attached (electrical characteristics of only the coil 21) were measured to find that the inductance L0 at 10 MHz was 0.76 μH, the RF resistance Rp0 at 20 MHz was 1,700Ω, the DC resistance Rs was 0.88Ω, and the self-resonance frequency fr0 was 226 MHz. These numerical data satisfy inequalities (5) to (9).

A ferrite core 20 was attached to the coil 21 to constitute a magnetic head 1, and the electrical characteristics of the coil 21 were measured to find that the inductance L1 at 10 MHz was 1.38 μH, the RF resistance Rp1 at 20 MHz was 2,990Ω, and the self-resonance frequency fr1 was 168 MHz. These numerical data satisfy inequalities (1) to (4).

The first example is suitable for the use when the maximum modulation frequency of the supply current is 8 MHz or more.

SECOND EXAMPLE

Coil patterns 31a and 31b are made from a copper film, and their pitch P, height H, and width W are set to 40 μm, 50 μm, and 25 μm, respectively. These numerical data satisfy inequalities (10), (11), and (12).

The interval Tb between the coil patterns 31a and 31b is set to 40 μm; the interval Tc (almost equal to the thickness of a protection coat 33b) between the end face of the coil pattern 31b and the lower surface of a coil 21 (surface of the protection coat 33b), to 20 μm; and the thickness T of the coil 21, to 180 μm. These numerical data satisfy inequalities (13), (14), and (15).

The number N of turns of the coil patterns is set to 28.5 (the number of turns of each of the coil patterns 31a and 31b is 14.25). This numerical data satisfies inequality (16).

The minimum radius r1 of the innermost periphery of the coil pattern is set to 0.12 mm; and the maximum radius r2 of the outermost periphery, to 0.71 mm. These numerical data satisfy inequalities (17) and (18).

The electrical characteristics of the coil 21 having these numerical data when no core 20 was attached (electrical characteristics of only the coil 21) were measured to find that the inductance L0 at 10 MHz was 0.68 μH, the RF resistance Rp0 at 20 MHz was 1,550Ω, the DC resistance Rs was 0.97Ω, and the self-resonance frequency fr0 was 251 MHz. These numerical data satisfy inequalities (5) to (9).

A ferrite core 20 was attached to the coil 21 to constitute a magnetic head 1, and the electrical characteristics of the coil 21 were measured to find that the inductance L1 at 10 MHz was 1.23 μH, the RF resistance Rp1 at 20 MHz was 2,700Ω, and the self-resonance frequency fr1 was 187 MHz. These numerical data satisfy inequalities (1) to (4).

The inductance L1 is lower in the second example than in the first example, and the second example is suitable for the use when the maximum modulation frequency of the supply current is 11 MHz or more.

THIRD EXAMPLE

Coil patterns 31a and 31b are made from a copper film, and their pitch P, height H, and width W are set to 30 μm, 45 μm, and 18 μm, respectively. These numerical data satisfy inequalities (10), (11), and (12).

The interval Tb between the coil patterns 31a and 31b is set to 40 μm; the interval Tc (almost equal to the thickness of a protection coat 33b) between the end face of the coil pattern 31b and the lower surface of a coil 21 (surface of the protection coat 33b), to 20 μm; and the thickness T of the coil 21, to 170 μm. These numerical data satisfy inequalities (13), (14), and (15).

The number N of turns of the coil patterns is set to 32.5 (the number of turns of each of the coil patterns 31a and 31b is 16.25). This numerical data satisfies inequality (16).

The minimum radius r1 of the innermost periphery of the coil pattern is set to 0.12 mm; and the maximum radius r2 of the outermost periphery, to 0.62 mm. These numerical data satisfy inequalities (17) and (18).

The electrical characteristics of the coil 21 having these numerical data when no core 20 was attached (electrical characteristics of only the coil 21) were measured to find that the inductance L0 at 10 MHz was 0.77 μH, the RF resistance Rp0 at 20 MHz was 1,760Ω, the DC resistance Rs was 1.58Ω, and the self-resonance frequency fr0 was 225 MHz. These numerical data satisfy inequalities (5) to (9).

A ferrite core 20 was attached to the coil 21 to constitute a magnetic head 1, and the electrical characteristics of the coil 21 were measured to find that the inductance L1 at 10 MHz was 1.39 μH, the RF resistance Rp1 at 20 MHz was 3,160Ω, and the self-resonance frequency fr1 was 167 MHz. These numerical data satisfy inequalities (1) to (4).

The third example is suitable for the use when the maximum modulation frequency of the supply current is 8 MHz or more. Since the number N of turns is larger than in the first and second examples, the third example can further increase the magnetic field generation efficiency.

FOURTH EXAMPLE

Coil patterns 31a and 31b are made from a copper film, and their pitch P, height H, and width W are set to 30 μm, 45 μm, and 18 μm, respectively. These numerical data satisfy inequalities (10), (11), and (12).

The interval Tb between the coil patterns 31a and 31b is set to 40 μm; the interval Tc (almost equal to the thickness of a protection coat 33b) between the end face of the coil pattern 31b and the lower surface of a coil 21 (surface of the protection coat 33b), to 20 μm; and the thickness T of the coil 21, to 170 μm. These numerical data satisfy inequalities (13), (14), and (15).

The number N of turns of the coil patterns is set to 28.5 (the number of turns of each of the coil patterns 31a and 31b is 14.25). This numerical data satisfies inequality (16).

The minimum radius r1 of the innermost periphery of the coil pattern is set to 0.12 mm; and the maximum radius r2 of the outermost periphery, to 0.56 mm. These numerical data satisfy inequalities (17) and (18).

The electrical characteristics of the coil 21 having these numerical data when no core 20 was attached (electrical characteristics of only the coil 21) were measured to find that the inductance L0 at 10 MHz was 0.52 μH, the RF resistance Rp0 at 20 MHz was 1,170Ω, the DC resistance Rs was 1.36Ω, and the self-resonance frequency fr0 was 298 MHz. These numerical data satisfy inequalities (5) to (9).

A ferrite core 20 was attached to the coil 21 to constitute a magnetic head 1, and the electrical characteristics of the coil 21 were measured to find that the inductance L1 at 10 MHz was 0.95 μH, the RF resistance Rp1 at 20 MHz was 2,020Ω, and the self-resonance frequency fr1 was 220 MHz. These numerical data satisfy inequalities (1) to (4).

Since the inductance L1 is lower than in the first and second examples, the fourth example is suitable for the use when the maximum modulation frequency of the supply current is 14 MHz or more.

To attain desirable electrical characteristics of the coil 21, not only numerical data of the coil pattern are optimized, as described above, but also the core 20 is formed from a soft magnetic material whose real part $\mu'$ and imaginary part $\mu''$ of the relative permeability at a frequency of 10 MHz are 300 or more and 1,600 or less, respectively. As such material, Mn—Zn ferrite HR52 or HR54 available from TDK, or Mn—Zn ferrite H3F7 or H3F8 available from Sumitomo Special Metals can be adopted.

To efficiently apply a magnetic field from the magnetic head 1 to the magneto-optical disk 11, the coil 21 must be brought sufficiently close to the magneto-optical disk 11. For this purpose, an interval d [μm] between the lower surface of the coil 21 facing the magneto-optical disk 11 and the lowest point of the sliding surface As or floating surface Af (i.e., the surface of the magneto-optical disk 11) desirably satisfies inequality (19):

$$d \leq 200 \; [\mu m] \tag{19}$$

By forming the protection coat 33b from a material excellent in lubricity and wear resistance, the lower surface of the coil 21 (surface of the protection coat 33b) facing the magneto-optical disk 11 may serve as the sliding surface As or floating surface Af. In this case, d=0.

[Second Embodiment]

Figure 4:
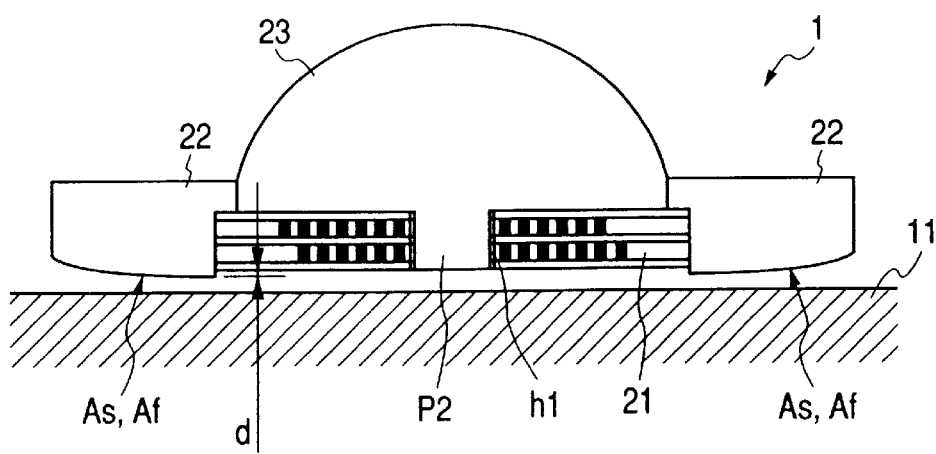
FIG. 4 is a side sectional view showing the structure of a magnetic head according to the second embodiment of the invention.
Figure 5:
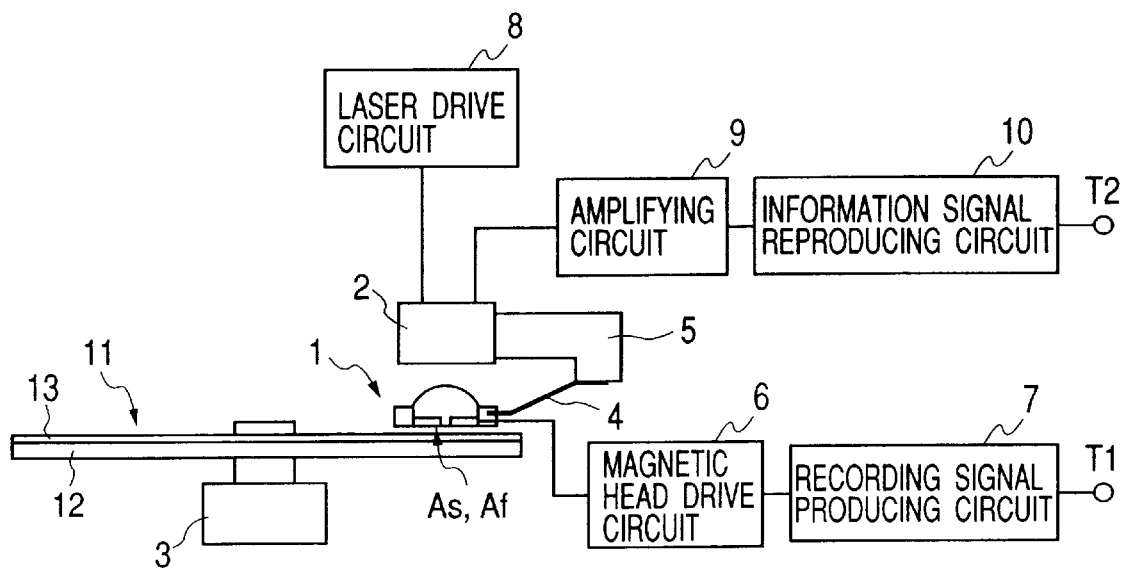
FIG. 5 is a block diagram showing the schematic arrangement of a magneto-optical recording apparatus according to the second embodiment of the present invention.

FIG. 4 is a side sectional view showing the structure of a magnetic head 1 according to the second embodiment of the invention. FIG. 5 shows the schematic arrangement of a magneto-optical recording apparatus according to the second embodiment of the present invention.

As shown in FIG. 4, the magnetic head 1 is constituted by a lens 23, a coil 21, and a slider 22 which mounts them. Reference numeral 11 denotes a magneto-optical disk serving as a magneto-optical recording medium for recording an information signal. The slider 22 is made of a resin material or ceramic excellent in lubricity and wear resistance. The lower surface of the slider 22 facing the magneto-optical disk 11 serves as a sliding surface As for sliding on the magneto-optical disk 11 or a floating surface Af for floating and gliding on the magneto-optical disk 11. FIG. 4 shows a state in which the magnetic head 1 floats and glides above the magneto-optical disk 11. The coil 21 has the same structure as that shown in FIGS. 2A to 2C in the first embodiment, and a detailed description thereof will be omitted.

The lens 23 is made of a light-transmitting material such as glass in a hemispherical shape, and a projection p2 is formed on the bottom of the lens 23. In the second embodiment, a hole h1 of the coil 21 is a light-transmitting portion, and allows inserting the projection p2 of the lens 23 in the hole h1. The projection p2 of the lens 23 faces the magneto-optical disk 11. While the distal end of the projection p2 is close to the surface of the magneto-optical disk 11, a laser beam is emitted from the distal end of the projection p2 to a magnetic recording layer 13 of the magneto-optical disk 11, thereby converging the laser beam into a small light spot.

In the second embodiment, the magnetic head 1 may or may not comprise a core made of a soft magnetic material such as ferrite. The optical head is arranged above the magnetic head 1. Even if the magnetic head 1 comprises a core, a light-transmitting portion such as a hole must be formed in the center of the core, and no projecting magnetic pole can be formed. Since the hole h1 of the coil 21 is a light-transmitting portion, a magnetic pole made of a light-shielding material such as ferrite cannot be inserted in the hole h1. From this, a flat core which is made of a soft magnetic material such as ferrite and has a light-transmitting portion such as a hole is attached between the upper surface of the coil 21 and the lens 23.

In FIG. 5, the magneto-optical disk 11 serves as a magneto-optical recording medium for recording an information signal, and is comprised of a substrate 12 formed from a transparent material and a magnetic recording layer 13 formed from a magnetic material on the substrate 12. The magneto-optical disk 11 is rotated by a spindle motor 3. The magnetic head 1 shown in FIG. 4 is arranged above the upper surface of the magneto-optical disk 11, and an optical head 2 is arranged above the magnetic head 1.

The magnetic head 1 is held at the distal end of an elastic support member 4 such that the sliding surface As or floating surface Af faces the upper surface of the magneto-optical disk 11. The proximal end of the support member 4 is attached to a coupling member 5, and the optical head 2 is also attached to the coupling member 5. The magnetic and optical heads 1 and 2 are integrally conveyed by a convey means (not shown) to arbitrary positions along the radial direction of the magneto-optical disk 11.

The coil 21 of the magnetic head 1 is connected to a magnetic head drive circuit 6, which is connected to a recording signal producing circuit 7.

The optical head 2 is made up of a laser source, optical sensor, optical system, and the like. The laser source is connected to a laser drive circuit 8, and the optical sensor is connected to an amplifying circuit 9.

To record an information signal on the magneto-optical disk 11, the magneto-optical disk 11 is rotated by the spindle motor 3. Then, the magnetic head 1 slides on or floats/glides above the magneto-optical disk 11. The recording signal producing circuit 7 performs processing such as coding for an information signal input from an input terminal T1, produces a recording signal, and sends the signal to the magnetic head drive circuit 6. The magnetic head drive circuit 6 supplies a current modulated by the recording signal to the coil 21 of the magnetic head 1. The amplitude of the current supplied to the coil is ±70 mA to ±160 mA, and its maximum modulation frequency is 8 MHz or more.

A magnetic field modulated by the information signal is generated from the magnetic head 1, and vertically applied to the magnetic recording layer 13 of the magneto-optical disk 11. At the same time, the laser source of the optical head 2 emits a laser beam upon reception of a current from the laser drive circuit 8. The laser beam converges into a small light spot via the optical system of the optical head 2 and the lens 23 mounted on the magnetic head 1, irradiating the magnetic field application region of the magnetic recording layer 13. As a result, a magnetized region whose magnetization direction changes in correspondence with changes in the direction of an applied magnetic field is formed on the magnetic recording layer 13, thereby recording the information signal.

To reproduce an information signal recorded in this manner, the optical head 2 irradiates the magnetic recording layer 13 with a laser beam of lower power than in recording while the magneto-optical disk 11 is rotated. The polarization plane of the laser beam reflected by the magnetic recording layer 13 rotates in correspondence with the magnetization direction of the magnetized region formed on the magnetic recording layer 13. This is detected by the optical sensor of the optical head 2, and the detection signal is amplified by the amplifying circuit 9. An information signal is reproduced from the detection signal amplified by an information signal reproducing circuit 10, and is output from an output terminal T2.

The lens 23 is used to converge a laser beam for irradiating the magnetic head 1 from the optical head 2 into a smaller light spot. If, however, the light spot of the laser beam need not be made smaller, the magnetic head 1 need not always comprise the lens 23. Instead, the magnetic head 1 may or may not comprise a member (e.g., glass plate) for transmitting a laser beam. In the second embodiment, the optical head 2 is arranged above the magnetic head 1, so that at least the coil 21 of the magnetic head 1 must have a light-transmitting portion such as the hole h1.

Also in the second embodiment, an impedance Z1 between first and second terminals 35a and 35b of the coil 21 in the magnetic head 1 can be equivalently expressed by an equivalent circuit constituted by an inductance L1, an RF resistance Rp1 parallel to the inductance L1, and a DC resistance Rs which is series-connected to the inductance L1 and is independent of the frequency, as shown in FIG. 6. Also, an impedance Z0 between the first and second terminals 35a and 35b of (only) the coil 21 to which at least the core 20 is not attached can be equivalently expressed by an equivalent circuit constituted by an inductance L0, an RF resistance Rp0 parallel to the inductance L0, and a DC resistance Rs which is series-connected to the inductance L0 and is independent of the frequency, as shown in FIG. 6. If the magnetic head 1 does not comprise any core, the inductance L1 and Rf resistance Rp1 of the coil 21 in the magnetic head 1 are equal to the inductance L0 and RF resistance Rp0 of only the coil 21. The DC resistance Rs is irrelevant to attachment/detachment of the core. The RF resistance Rp0 of only the coil 21 is mainly generated under the influence of the proximity and skin effects on the coil pattern. The RF resistance Rp1 of the coil 21 in the magnetic head 1 to which the core 20 is attached is further influenced by the RF loss in the core 20. As the values of the RF resistances Rp1 and Rp0 are larger, the AC power loss is desirably smaller.

Since the second embodiment does not employ at least a core having a projecting magnetic pole, the electrical characteristics of the coil 21 of the magnetic head 1 and the numerical data of a coil pattern capable of realizing this are different from those in the first embodiment. Desirable electrical characteristics of the coil 21 in the second embodiment will be described.

To increase the modulation frequency without increasing the drive voltage in recording an information signal, the inductance L1 must be reduced. For example, to set the maximum modulation frequency to 8 MHz or more, the inductance L1 [μH] desirably satisfies inequality (20):

$$L1 \leq 1.4 \, [\mu H] \tag{20}$$

As the RF resistance Rp1 is higher, the AC power loss is smaller. Moreover, a current supplied to the coil 21 of the magnetic head 1 contains a frequency component exceeding the maximum modulation frequency as the current waveform approaches a rectangle. Therefore, to reduce the power consumption of the magnetic head 1, the RF resistance Rp1 [Ω] at a frequency of 20 MHz desirably satisfies inequality (21):

$$Rp1 \geq L1 \times 1200 \tag{21}$$

The RF resistance Rp1 [Ω] more desirably satisfies inequality (22):

$$Rp1 \geq L1 \times 1500 \tag{22}$$

If the electrostatic capacitance C between the first and second terminals 35a and 35b of the coil 21 is 1.4 [pF] or less, the frequency fr1 [MHz] which maximizes the impedance magnitude |Z1|, and the inductance L1 at 10 MHz satisfy inequality (23) (note that inequality (23) is the same as inequality (4)):

$$fr1 \geq 1/(2\pi\sqrt{L1 \times 1.4 \times 10^{-6}}) \tag{23}$$

As a result, the self-resonance frequency fr1 of the coil 21 can be set much higher than the maximum modulation frequency.

The presentg inventor has made extensive studies to find that to make the electrical characteristics of the magnetic head 1 satisfy inequalities (20) and (21), the electrical characteristics of the coil 21 (electrical characteristics of only the coil 21) when the core 20 is not attached, i.e., the inductance L0 [μH] and the RF resistance Rp0 [Ω] at a frequency of 20 MHz desirably satisfy inequalities (24) and (25) in correspondence with inequalities (20) and (21):

$$L0 \leq 1.4 \, [\mu H] \tag{24}$$

$$Rp0 \geq L0 \times 1200 \tag{25}$$

The RF resistance Rp0 [Ω] more desirably satisfies inequality (26):

$$Rp0 \geq L0 \times 1500 \tag{26}$$

In addition, the frequency fr0 [MHz] which maximizes an impedance magnitude |Z0| of only the coil 21, and the inductance L0 at 10 MHz satisfy inequality (28) (note that inequality (28) is the same as inequality (9)):

$$fr0 \geq 1/(2\pi\sqrt{L0 \times 1.4 \times 10^{-6}}) \tag{28}$$

If the magnetic head 1 does not comprise any core, L1=L0 and Rp1=Rp0 hold. As far as inequalities (24), (25), and (26) are only satisfied, inequalities (20), (21), and (22) can necessarily be satisfied.

As the DC resistance Rs is lower, the DC power loss of the magnetic head is smaller. To reduce the power consumption of the magnetic head, the DC resistance Rs [Ω] desirably satisfies inequality (27) (regardless of attachment/detachment of the core):

$$Rs \leq 6[\Omega] \tag{27}$$

The second embodiment does not use at least a core having a projecting magnetic pole, unlike the first embodiment, so that the lower limits of the RF resistances Rp1 and Rp0 given by inequalities (21), (22), (25), and (26) and the upper limit of the DC resistance Rs given by inequality (27) are different from those given by inequalities (2), (3), (6), (7), and (8).

Also in the second embodiment, the inductances L0 and L1 are values at a frequency of 10 MHz, and the RF resistances Rp0 and Rp1 are values at a frequency of 20 MHz. The inductances L0 and L1, DC resistance Rs, RF resistances Rp0 and Rp1, and self-resonance frequencies fr0 and fr1 are values measured between the first and second terminals 35a and 35b. If conductive members such as leads for supplying a current are connected to the first and second terminals 35a and 35b of the coil 21 in measurement, they influence measurement values. To prevent this, such conductive members must be disconnected from the first and second terminals 35a and 35b of the coil 21 in measurement. A detailed measurement method is the same as described in the first embodiment.

The present inventor has made studies on the electrical characteristics of the coil to find that the coil 21 having desirable electrical characteristics that satisfy inequalities (24) to (28) can be implemented by a coil pattern having the following characteristics.

As shown in FIGS. 2A to 2C, the coil 21 is made up of two to four flat spiral coil patterns which are formed with the same central axis and series-connected, i.e., the two coil patterns 31a and 31b in this embodiment. If the number of coil patterns is one or five or more, it is difficult to sufficiently increase the magnetic field generation efficiency without increasing the inductance L0. Five or more coil patterns increase the coil thickness to increase the height of the magnetic pole p1 of the core 20 resulting in a large RF loss in the core 20. Three or four coil patterns may be formed by stacking. In this case, the manufacturing process becomes more complicated than in the second embodiment. By forming the same number of coil patterns on the upper and lower surface sides of the core 21, the two surfaces of the coil 21 simultaneously expand/contract upon temperature changes in the manufacture or use, which prevents deformation of the ccoil 21. It is, therefore, the most desirable to form single coil patterns on both the upper and lower surface sides of the core 21, like the second embodiment.

The coil pattern has an almost rectangular sectional shape. P represents the pitch (minimum value if the pitch changes depending on the position) of the coil pattern; W, the width of the sectional shape at the minimum pitch P; and H, the height. r1 represents the minimum radius of the innermost periphery of the coil pattern (minimum value of the distance from a center X of the coil patterns 31a and 31b to the innermost periphery); and r2, the maximum radius of the outermost periphery of the coil pattern (maximum value of the distance from the center X of the coil patterns 31a and 31b to the outermost periphery). N represents the number of turns of the coil patterns (the total number of turns of the coil patterns 31a and 31b).

A smaller pitch P of the coil pattern can desirably decrease the inductance L0 of the ccoil 21. However, if the width W and height H also decrease with a decrease in pitch P, the sectional area of the coil pattern decreases to increase the DC resistance Rs of the coil pattern. In addition, the circumferential length (2W+2H) of the coil pattern decreases to undesirably reduce the RF resistance Rp0 owing to the skin effect. To the contrary, an excessively large height H increases the coil thickness to decrease the magnetic field generation efficiency. As a result of increasing the electrostatic capacitance C, the self-resonance frequency fr0 decreases. This makes the manufacture difficult. Hence, the range of the height H (or H/W) must be properly selected in accordance with the pitch P of the coil pattern as follows. More specifically, to make the electrical characteristics of the coil 21 satisfy inequalities (24) to (28), the pitch P [μm], width W [μm], and height H [μm] of the coil pattern desirably satisfy inequalities (29) and (30):

$$15 [\mu m] \leq P \leq 50 [\mu m] \tag{29}$$

$$1.85 - 0.012P \leq H/W \leq 7.25 - 0.06P \tag{30}$$

A higher ratio W/P can decrease the DC resistance Rs of the coil. However, an excessively high ratio W/P decreases the RF resistance Rp0 due to the proximity effect with an adjacent coil pattern. As a result of increasing the electrostatic capacitance C, the self-resonance frequency fr0 decreases. From this, W/P desirably satisfies inequality (31) (note that inequality (31) is the same as inequality (12)):

$$0.55 \leq W/P \leq 0.8 \tag{31}$$

To increase the magnetic field generation efficiency, an interval Tb between the coil patterns 31a and 31b, and an interval Tc (almost equal to the thickness of the protection coat 33b) between the end face of the coil pattern 31b formed on the lower surface of the, coil 21 facing the magneto-optical disk 11 and the lower surface of the coil 21 (surface of the protection coat 33b) must be set sufficiently small. In addition, a total thickness T of the coil 21 must be set small, and the coil patterns 31a and 31b must be brought closer to the magneto-optical disk 11. However, an excessively small interval Tb decreases the RF resistance Rp0 or increases the electrostatic capacitance C due to the proximity effect between the coil patterns 31a and 31b, thereby decreasing the self-resonance frequency fr0. To prevent this, the interval Tb [μm], interval Tc [μm], and thickness T [μm] preferably satisfy inequalities (32), (33), and (34):

$$2 [\mu m] \leq Tb \leq 70 [\mu m] \tag{32}$$

$$Tc \leq 1.5H [\mu m] \tag{33}$$

$$30 [\mu m] \leq T \leq 300 [\mu m] \tag{34}$$

Even if the number N of turns of the coil patterns is not set as small as that in the first embodiment, the inductance L0 decreases. To prevent a decrease in magnetic field generation efficiency, the number N of turns is desirably larger than that in the first embodiment, and must be set within a proper range given by inequality (35):

$$20 \leq N \leq 70 \tag{35}$$

Since the second embodiment does not employ any core having a projecting magnetic pole, the minimum radius r1 of the innermost periphery of the coil pattern and the maximum radius r2 of the outermost periphery must be set smaller than in the first embodiment in order to compensate for a decrease in magnetic field generation efficiency. Therefore, the minimum radius r1 [mm] of the innermost periphery of the coil pattern and the maximum radius r2 [mm] of the outermost periphery desirably satisfy inequalities (36) and (37):

$$r1 \leq 0.13 \text{ [mm]} \quad (36)$$

$$r2 \leq 1.0 \text{ [mm]} \quad (37)$$

Several examples of the coil 21 in the second embodiment of the present invention will be described together with numerical data.

FIFTH EXAMPLE

Coil patterns 31a and 31b are made from a copper film, and their pitch P, height H, and width W are set to 35 μm, 50 μm, and 22 μm, respectively. These numerical data satisfy inequalities (29), (30), and (31).

The interval Tb between the coil patterns 31a and 31b is set to 30 μm; the interval Tc (almost equal to the thickness of a protection coat 33b) between the end face of the coil pattern 31b and the lower surface of a coil 21 (surface of the protection coat 33b), to 15 μm; and the thickness T of the core 21, to 160 μm. These numerical data satisfy inequalities (32), (33), and (34).

The number N of turns of the coil patterns is set to 40.5 (the number of turns of each of the coil patterns 31a and 31b is 20.25). This numerical data satisfies inequality (35).

The minimum radius r1 of the innermost periphery of the coil pattern is set to 0.07 mm; and the maximum radius r2 of the outermost periphery, to 0.79 mm. These numerical data satisfy inequalities (36) and (37).

The electrical characteristics of the coil 21 having these numerical data when no core 20 was attached (electrical characteristics of only the coil 21) were measured to find that the inductance L0 at 10 MHz was 1.15 pH, the RF resistance Rp0 at 20 MHz was 2,550Ω, the DC resistance Rs was 1.85Ω, and the self-resonance frequency fr0 was 176 MHz. These numerical data satisfy inequalities (24) to (28).

In the magnetic head 1 to which the coil 21 was attached (but no core was attached), the electrical characteristics of the coil 21 were measured to find that the inductance L1 at 10 MHz was 1.15 μH, and the RF resistance Rp1 at 20 MHz was 2,550Ω, which were equal to L0 and Rp0, respectively, and the self-resonance frequency fr1 was 176 MHz. These numerical data satisfy inequalities (20) to (23).

The fifth example is suitable for the use when the maximum modulation frequency of the supply current is 11 MHz or more.

SIXTH EXAMPLE

Coil patterns 31a and 31b are made from a copper film, and their pitch P, height H, and width W are set to 25 μm, 50 μm, and 15 μm, respectively. These numerical data satisfy inequalities (29), (30), and (31).

The interval Tb between the coil patterns 31a and 31b is set to 30 μm; the interval Tc (almost equal to the thickness of a protection coat 33b) between the end face of the coil pattern 31b and the lower surface of a coil 21 (surface of the protection coat 33b), to 15 μm; and the thickness T of the core 21, to 160 μm. These numerical data satisfy inequalities (32), (33), and (34).

The number N of turns of the coil patterns is set to 48.5 (the number of turns of each of the coil patterns 31a and 31b is 24.25). This numerical data satisfies inequality (35).

The minimum radius r1 of the innermost periphery of the coil pattern is set to 0.07 mm; and the maximum radius r2 of the outermost periphery, to 0.69 mm. These numerical data satisfy inequalities (36) and (37).

The electrical characteristics of the coil 21 having these numerical data when no core 20 was attached (electrical characteristics of only the coil 21) were measured to find that the inductance L0 at 10 MHz was 1.33 μH, the RF resistance Rp0 at 20 MHz was 2,940 Ω, the DC resistance Rs was 2.80 Ω, and the self-resonance frequency fr0 was 163 MHz. These numerical data satisfy inequalities (24) to (28).

In the magnetic head 1 to which the coil 21 was attached (but no core was attached), the electrical characteristics of the coil 21 were measured to find that the inductance L1 at 10 MHz was 1.33 μH, the RF resistance Rp1 at 20 MHz was 2,940Ω, which were equal to L0 and Rp0, and the self-resonance frequency fr1 was 163 MHz. These numerical data satisfy inequalities (20) to (23).

The sixth example is suitable for the use when the maximum modulation frequency of the supply current is 8 MHz or more. Since the number N of turns is larger than in the fifth example, the magnetic field generation efficiency further increases.

SEVENTH EXAMPLE

Coil patterns 31a and 31b are made from a copper film, and their pitch P, height H, and width W are set to 25 μm, 50 μm, and 15 μm, respectively. These numerical data satisfy inequalities (29), (30), and (31).

The interval Tb between the coil patterns 31a and 31b is set to 30 μm; the interval Tc (almost equal to the thickness of a protection coat 33b) between the end face of the coil pattern 31b and the lower surface of a coil 21 (surface of the protection coat 33b), to 15 μm; and the thickness T of the core 21, to 160 μm. These numerical data satisfy inequalities (32), (33), and (34).

The number N of turns of the coil patterns is set to 40.5 (the number of turns of each of the coil patterns 31a and 31b is 20.25). This numerical data satisfies inequality (35).

The minimum radius r1 of the innermost periphery of the coil pattern is set to 0.07 mm; and the maximum radius r2 of the outermost periphery, to 0.59 mm. These numerical data satisfy inequalities (36) and (37).

The electrical characteristics of the coil 21 having these numerical data when no core 20 was attached (electrical characteristics of only the coil 21) were measured to find that the inductance L0 at 10 MHz was 0.92 μH, the RF resistance Rp0 at 20 MHz was 2,000Ω, the DC resistance Rs was 2.03Ω, and the self-resonance frequency fr0 was 203 MHz. These numerical data satisfy inequalities (24) to (28).

In the magnetic head 1 to which the coil 21 was attached (but no core was attached), the electrical characteristics of the coil 21 were measured to find that the inductance L1 at 10 MHz was 0.92 μH, the RF resistance Rp1 at 20 MHz was 2,000Ω, which were equal to L0 and Rp0, respectively, and the self-resonance frequency fr1 was 203 MHz. These numerical data satisfy inequalities (20) to (23).

The seventh example is suitable for the use when the maximum modulation frequency of the supply current is 14 MHz or more.

As described above, in the second embodiment, the magnetic head 1 does not comprise any core, or even if it comprises a core, the core cannot have any projecting magnetic pole. To compensate for a decrease in magnetic field generation efficiency, the coil 21 must be brought closer to the magneto-optical disk 11 in the second embodiment. For this purpose, an interval d [μm] between the lower surface of the coil 21 facing the magneto-optical disk 11 and the lowest point of the sliding surface As or floating surface Af (i.e., the surface of the magneto-optical disk 11) desirably satisfies inequality (38):

$$d \leq 100\ [\mu m] \tag{38}$$

By forming the protection coat 33b from a material excellent in lubricity and wear resistance, the lower surface of the coil 21 (surface of the protection coat 33b) facing the magneto-optical disk 11 may serve as the sliding surface As or floating surface Af. In this case, d=0.

The coils 21 described in the first and second embodiments can be manufactured by the following method. FIGS. 7A to 7E to FIGS. 8F and 8J show the manufacturing steps of the coil 13.

Figure 7A:
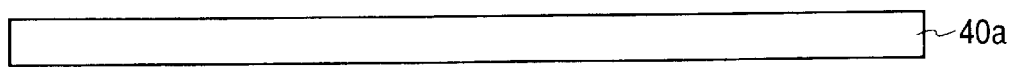
FIGS. 7A, 7B, 7C, 7D, and 7E are sectional views, respectively, showing the steps in manufacturing the magnetic head coil according to the present invention.

FIG. 7A shows the original plate polishing step. There is prepared an original plate 40a which is made of a conductive material such as aluminum, copper, or zinc with a thickness of about 0.1 mm and has a flat, smooth surface. The surface of the original plate 40a undergoes, in accordance with its material, special surface treatment, e.g., chemical treatment disclosed in, e.g., Japanese Patent Application Laid-Open No. 8-279672, or both physical polishing and chemical treatment. As a result, the surface diffusion reflectivity at the photosensitive wavelength (e.g., 365 nm) of a photosensitive resin material (to be described later) is set to 20% or less.

Figure 7B:
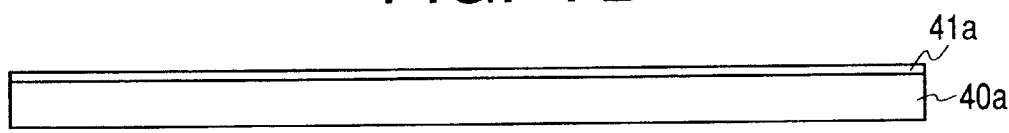

FIG. 7B shows the photosensitive resin material coating step. A blade coater uniformly applies a photosensitive resin material 41a to the surface of the original plate 40a to a predetermined thickness. An example of the photosensitive resin material 41a is a liquid photosensitive resin composition disclosed in Japanese Patent Application Laid-Open No. 6-283830, e.g., a liquid photosensitive resin composition containing an ethylene unsaturated compound monomer and a prepolymer or oligomer having ethylene unsaturated bonds at an ethylene unsaturated bond concentration of $10^{-2}$ to $2 \times 10^{-4}$ mol/g and a molecular weight of 500 to 100,000. This material can form a coil pattern having a pitch P of 15 to 100 μm, a height H of 15 to 200 μm, a width W of 10 to 80 μm, and H/W of 1 to 7. The pitch P, width W, and height H of the coil pattern optimally satisfy inequalities (10), (11), and (12) or inequalities (29), (30), and (31).

Figure 7C:
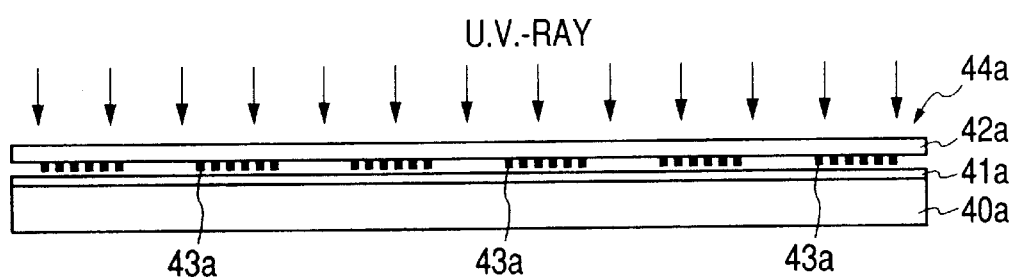

FIG. 7C shows the exposure step. A mask 44a with many coil patterns and terminals formed from a metal film 43a of chromium or the like on a glass substrate 42a is arranged on the original plate 40a so as to face the surface of the original plate 40a. Parallel ultraviolet beams are emitted by a high-pressure mercury-vapor lamp serving as a light source via the mask 44a, thereby exposing the photosensitive resin material 41a applied to the original plate 40a. In this step, ultraviolet rays are emitted as parallel beams, and the; surface diffusion reflectivity of the original plate 40a is set to 20% or less, as described above. Thus, reaction of the photosensitive resin material is completely prevented immediately below the metal film 43a. As a result, a coil pattern having a rectangular section at H/W of 1 to 7 can be formed.

Figure 7D:
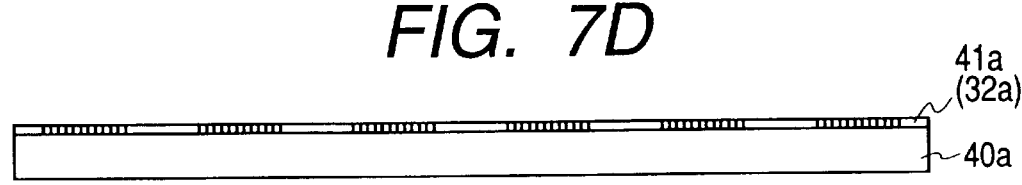

FIG. 7D shows the developing step. The exposed original plate 40a is developed to selectively remove the exposed or unexposed portion of the photosensitive resin material 41a. The residual portion of the photosensitive resin material 41a functions as an insulating member 32a of a coil.

Figure 7E:
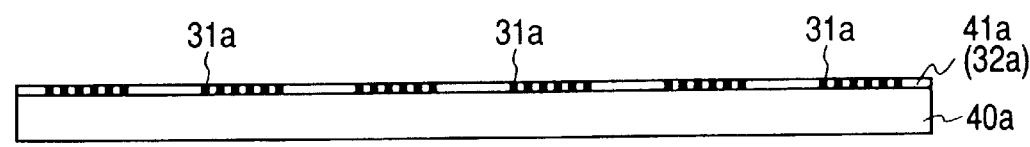

FIG. 7E shows the plating step. A coil pattern 31a, and first and second terminals 35a and 35b (not shown) that are made of a conductive material film such as a copper film are formed by plating at the removed portion of the photosensitive resin material 41a on the surface of the original plate 40a. The thickness of the coil pattern 31a is equal to that of the photosensitive resin material 41a (insulating member 32a).

Similar to the original plate 40a, an original plate 40b having a coil pattern 31b and insulating member 32b formed on the surface is prepared by the steps in FIGS. 7A to 7E.

Figure 8F:
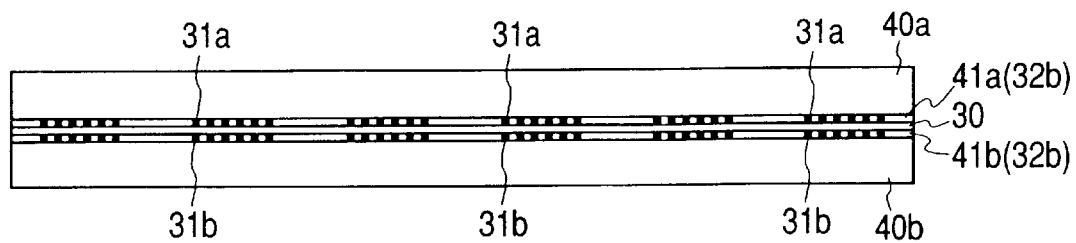
FIGS. 8F, 8G, 8H, 8I, and 8J are sectional views, respectively, showing the steps in manufacturing the magnetic head coil according to the present invention.

FIG. 8F shows the bonding step. The original plates 40a and 40b are bonded with an adhesive via a base 30 as a sheet made of a resin material such as polyimide with a thickness of 2 to 70 μm such that the coil patterns 31a and 31b face and accurately overlap each other. When the adhesive layer between the coil patterns 31a and 31b has a satisfactory insulating function, the coil patterns 31a and 31b need not sandwich the base 30.

Figure 8G:
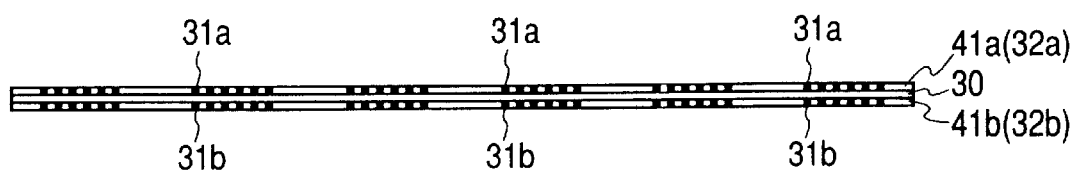

FIG. 8G is the original plate removal step. The original plates 40a and 40b are peeled off and removed from the coil patterns 31a and 31b and the insulating members 32a and 32b. Alternately, the original plates 40a and 40b may be dissolved and removed with an acid or alkali solution. The coil pattern 31a and insulating member 32a, and the coil pattern 31b and insulating member 32b are formed in tight contact with the surfaces of the original plates 40a and 40b, respectively. Thus, the surfaces of the coil pattern 31a and insulating member 32a and those of the coil pattern 31b and insulating member 32b that are exposed after the original plates 40a and 40b are removed are formed in plane, and the coil patterns 31a and 31b do not project from the surface. The surface patterns on the original plates 40a and 40b are directly transferred, the coil patterns 31a and 31b are very flat and smooth.

Figure 8H:
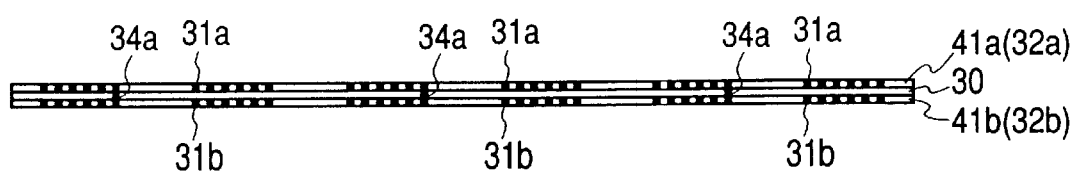

FIG. 8H shows the interconnection forming step. Interconnections 34a and 34b (not shown) such as through holes are formed in part of the coil patterns 31a and 31b. The inner walls of the connecting portions 34a and 34b are coated with a conductive material film such as a copper film by plating, or the connecting portions 34a and 34b are filled with a paste containing a conductive material, thereby connecting them.

Figure 8I:
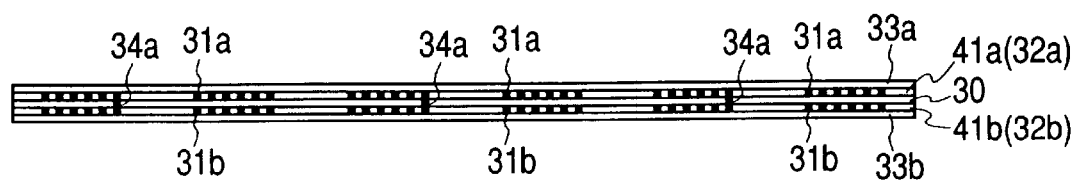

FIG. 8I shows the protection coat forming step. Protection coats 33a and 33b are respectively formed on the coil pattern 31a and insulating member 32a, and the coil pattern 31b and insulating member 32b by applying a resin material or bonding a resin material sheet. Since the surfaces of the coil pattern 31a and insulating member 32a and those of the coil pattern 31b and insulating member 32b are flat and smooth, the protection coats 33a and 33b can be uniformly formed with flat and smooth surfaces at small thicknesses which satisfy inequality (14) or (33).

Figure 8J:
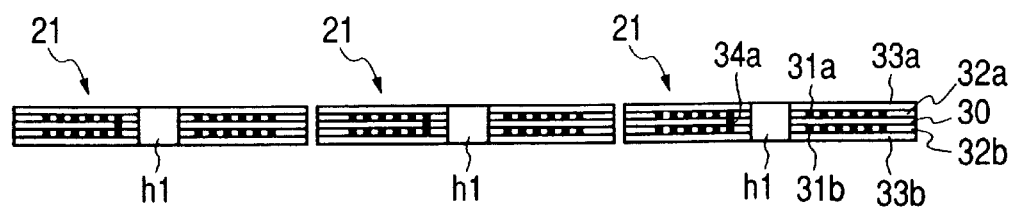
Figure 9:
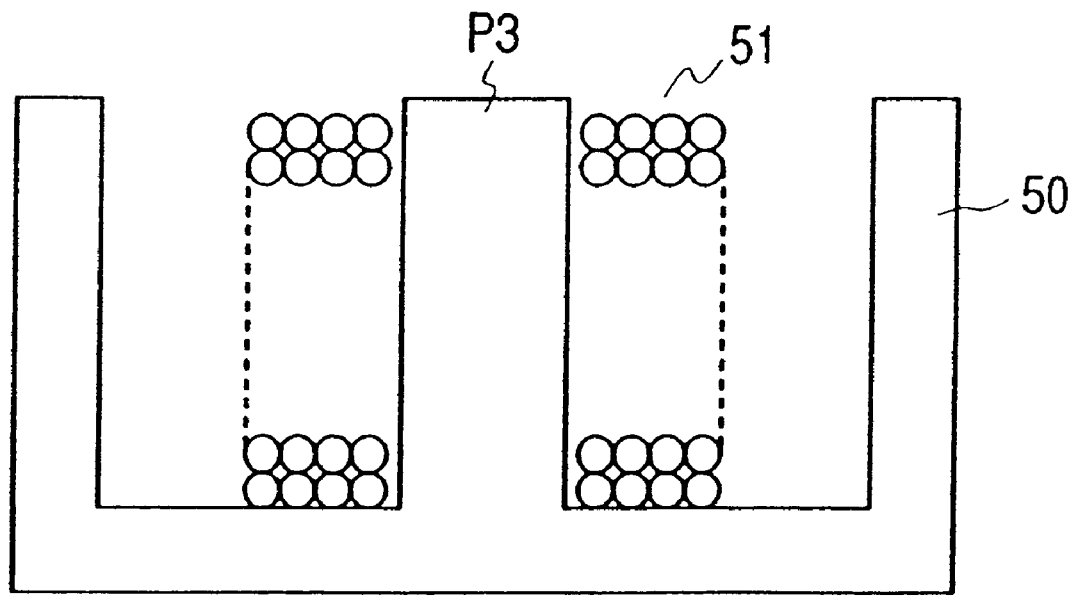
FIG. 9 is a sectional view showing the structure of a conventional magnetic head.

FIG. 8J shows the outer shape processing step. In this step, holes h1 are formed at the centers of many coils 21 formed in the above steps. The respective coils 21 are cut into a predetermined shape, thereby separating them from each other. Formation of the holes h1 and cutting can use laser processing or punching.

This manufacturing method can easily manufacture the coil 21 characterized by the sizes of respective parts described in the first and second embodiments.

Industrial Applicability

As has been described above, in the magnetic head coil and magnetic head according to the present invention, the coil is formed from two to four flat spiral coil patterns. Optimizing the numerical data of each coil pattern in the above-described manner can sufficiently reduce the inductance and DC resistance and can satisfactorily increase the RF resistance, compared to a conventional coil formed from a magnetic wire. This decreases the RF loss of the magnetic head when the maximum modulation frequency of the magnetic field is set higher. The problem can be solved in which heat generated by the magnetic head degrades the magnetic characteristics of the magnetic head, and a magnetic field of a desired strength is difficult to generate. Since the drive voltage applied to the coil can also be reduced, the maximum modulation frequency of the magnetic field can be set to 8 MHz or more without increasing power consumption of the magneto-optical recording apparatus. Accordingly, the recording speed of an information signal can increase.

What is claimed is:

1. A flat magnetic head coil constituted by spiral coil patterns made of a conductive material film and two terminals connected to the coil patterns, characterized in that the coil patterns have a substantially rectangular sectional shape, a minimum pitch P [$\mu$m] of the coil pattern, a width W [$\mu$m] of the sectional shape at the minimum pitch P, and a height H [$\mu$m] satisfy inequalities (10) and (11):

$$15\ [\mu m] \leq P \leq 70\ [\mu m] \tag{10}$$

$$1.85 - 0.012P \leq H/W \leq 7.5 - 0.06P \tag{11}$$

when an impedance Z0 between the two terminals of the coil while at least a core made of a magnetic material is not attached is regarded to be equivalently constituted by an inductance L0, an RF resistance Rp0 parallel to the inductance L0, and a DC resistance Rs which is series-connected to the inductance L0 and is independent of a frequency, the inductance L0 [$\mu$H] at 10 MHz satisfies inequality (5):

$$L0 \leq 0.85\ [\mu H] \tag{5}$$

2. A magnetic head coil according to claim 1, characterized in that the inductance L0 [$\mu$H] at 10 MHz, and the RF resistance Rp0 [$\Omega$] at 20 MHz and the DC resistance Rs [$\Omega$] satisfy inequalities (6) and (8):

$$Rp0 \geq L0 \times 1500 \tag{6}$$

$$Rs \leq 2[\Omega] \tag{8}$$

3. A magnetic head coil according to claim 2, characterized in that the inductance L0 [$\mu$H] at 10 MHz, and the RF resistance Rp0 [$\Omega$] at 20 MHz satisfy inequality (7):

$$Rp0 \geq L0 \times 2000 \tag{7}$$

4. A magnetic head coil according to any one of claims 1 to 3, characterized in that at least one of the coil patterns is formed on a lower surface side of the magnetic head coil facing a magneto-optical recording medium, and an interval Tb [$\mu$m] between the coil patterns, an interval Tc [$\mu$m] between an end face of the coil pattern formed on the lower surface side and a lower surface of the magnetic head coil, and a thickness T [$\mu$m] of the magnetic head coil satisfy inequalities (13), (14), and (15):

$$2\ [\mu m] \leq Tb \leq 70\ [\mu m] \tag{13}$$

$$Tc \leq 1.5H \tag{14}$$

$$50\ [\mu m] \leq T \leq 450\ [\mu m] \tag{15}$$

5. A magnetic head coil according to any one of claims 1 to 3, characterized in that a total number N of turns of the coil patterns, a minimum radius r1 [mm] of an innermost periphery of the coil pattern, and a maximum radius r2 [mm] of an outermost periphery satisfy inequalities (16), (17), and (18):

$$14 \leq N \leq 40 \tag{16}$$

$$r1 \leq 0.2\ [mm] \tag{17}$$

$$r2 \leq 1.1\ [mm] \tag{18}$$

6. A flat magnetic head coil constituted by spiral coil patterns made of a conductive material film and two terminals connected to the coil patterns, characterized in that a light-transmitting portion is formed at a center of the coil, the coil patterns have a substantially rectangular sectional shape, a minimum pitch P [$\mu$m] of the coil pattern, a width W [$\mu$m] of the sectional shape at the minimum pitch P, and a height H [$\mu$m] satisfy inequalities (29) and (30):

$$15\ [\mu m] \leq P \leq 50\ [\mu m] \tag{29}$$

$$1.85 - 0.012P \leq H/W \leq 7.5 - 0.06P \tag{30}$$

when an impedance Z0 between the two terminals of the coil while at least a core made of a magnetic material is not attached is regarded to be equivalently constituted by an inductance L0, an RF resistance Rp0 parallel to the inductance L0, and a DC resistance Rs which is series-connected to the inductance L0 and is independent of a frequency, the inductance L0 [$\mu$H] at 10 MHz satisfies inequality (24):

$$L0 \leq 1.4\ [\mu H] \tag{24}$$

7. A magnetic head coil according to claim 6, characterized in that the inductance L0 [$\mu$H] at 10 MHz, and the RF resistance Rp0 [$\Omega$] at 20 MHz and the DC resistance Rs [$\Omega$] satisfy inequalities (25) and (27):

$$Rp0 \geq L0 \times 1200 \tag{25}$$

$$Rs \leq 6[\Omega] \tag{27}$$

8. A magnetic head coil according to claim 7, characterized in that the inductance L0 [$\mu$H] at 10 MHz, and the RF resistance Rp0 [$\Omega$] at 20 MHz satisfy inequality (26):

$$Rp0 \geq L0 \times 1500 \tag{26}$$

9. A magnetic head coil according to any one of claims 6 to 8, characterized in that at least one of the coil patterns is formed on a lower surface side of the magnetic head coil facing a magneto-optical recording medium, and an interval Tb [$\mu$m] between the coil patterns, an interval Tc [$\mu$m] between an end face of the coil pattern formed on the lower surface side and a lower surface of the magnetic head coil, and a thickness T [$\mu$m] of the magnetic head coil satisfy inequalities (32), (33), and (34):

$$2\ [\mu m] \leq Tb \leq 70\ [\mu m] \tag{32}$$

$$Tc \leq 1.5H \tag{33}$$

$$30\ [\mu m] \leq T \leq 300\ [\mu m] \tag{34}$$

10. A magnetic head coil according to any one of claims 6 to 8, characterized in that a total number N of turns of the coil patterns, a minimum radius r1 [mm] of an innermost periphery of the coil pattern, and a maximum radius r2 [mm] of an outermost periphery satisfy inequalities (35), (36), and (37):

$$20 \leq N \leq 70 \tag{35}$$

$$r1 \leq 0.13\ [mm] \tag{36}$$

$$r2 \leq 1.0\ [mm] \tag{37}$$

11. A magnetic head coil according to any one of claims 1 to 3, characterized in that when at least a core made of a magnetic material is not attached, a self-resonance frequency fr0 [MHz] which maximizes an impedance magnitude |Z0| of the coil, and the inductance L0 [µH] at 10 MHz satisfy inequality (9):

$$fr0 \geq 1/(2\pi\sqrt{L0 \times 1.4 \times 10^{-6}}) \quad (9).$$

12. A magnetic head coil according to any one of claims 1 to 3, characterized in that two to four coil patterns are formed.

13. A magnetic head coil according to any one of claims 1 to 3, characterized in that the pitch P [µm] and the width W [µm] on the coil pattern satisfy inequality (12):

$$0.55 \leq W/P \leq 0.8 \quad (12).$$

14. A magnetic head having a core made of a magnetic material and a flat coil, characterized in that the coil is constituted by spiral coil patterns made of a conductive material film and two terminals connected to the coil patterns, the coil patterns have a substantially rectangular sectional shape, a minimum pitch P [µm] of the coil pattern, a width W [µm] of the sectional shape at the minimum pitch P, and a height H [µm] satisfy inequalities (10) and (11):

$$15\,[\mu m] \leq P \leq 70\,[\mu m] \quad (10)$$

$$1.85 - 0.012P \leq H/W \leq 7.5 - 0.06P \quad (11)$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [µH] at 10 MHz satisfies inequality (1):

$$L1 \leq 1.4\,[\mu H] \quad (1).$$

15. A magnetic head according to claim 14, characterized in that the inductance L1 [µH] at 10 MHz, and the RF resistance Rp1 [Ω] at 20 MHz and the DC resistance Rs [Ω] satisfy inequalities (2) and (8):

$$Rp1 \geq L1 \times 1500 \quad (2)$$

$$Rs \leq 2\,[\Omega] \quad (8).$$

16. A magnetic head according to claim 15, characterized in that the inductance L1 [µH] at 10 MHz, and the RF resistance Rp1 [Ω] at 20 MHz satisfy inequality (3):

$$Rp1 \geq L1 \times 2000 \quad (3).$$

17. A magnetic head according to any one of claims 14 to 16, characterized in that at least one of the coil patterns is formed on a lower surface side of the coil facing a magneto-optical recording medium, and an interval Tb [µm] between the coil patterns, an interval Tc [µm] between an end face of the coil pattern formed on the lower surface side and a lower surface of the coil, and a thickness T [µm] of the coil satisfy inequalities (13), (14), and (15):

$$2\,[\mu m] \leq Tb \leq 70\,[\mu m] \quad (13)$$

$$Tc \leq 1.5H \quad (14)$$

$$50\,[\mu m] \leq T \leq 450\,[\mu m] \quad (15).$$

18. A magnetic head according to any one of claims 14 to 16, characterized in that a total number N of turns of the coil patterns, a minimum radius r1 [mm] of an innermost periphery of the coil pattern, and a maximum radius r2 [mm] of an outermost periphery satisfy inequalities (16), (17), and (18):

$$14 \leq N \leq 40 \quad (16)$$

$$r1 \leq 0.2\,[mm] \quad (17)$$

$$r2 \leq 1.1\,[mm] \quad (18).$$

19. A magnetic head according to any one of claims 14 to 16, characterized in that the magnetic head has a sliding surface for sliding on a magneto-optical recording medium or a floating surface for floating and gliding, and an interval d [µm] between a lower surface of the coil facing the magneto-optical recording medium and a lowest point of the sliding surface or the floating surface satisfies inequality (19):

$$d \leq 200\,[\mu m] \quad (19).$$

20. A magnetic head having a flat coil, characterized in that the coil is constituted by spiral coil patterns made of a conductive material film and two terminals connected to the coil patterns, a light-transmitting portion is formed at a center of the coil, the coil patterns have a substantially rectangular sectional shape, a minimum pitch P [µm] of the coil pattern, a width W [µm] of the sectional shape at the minimum pitch P, and a height H [µm] satisfy inequalities (29) and (30):

$$15\,[\mu m] \leq P \leq 50\,[\mu m] \quad (29)$$

$$1.85 - 0.012P \leq H/W \leq 7.5 - 0.06P \quad (30)$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [µH] at 10 MHz satisfies inequality (20):

$$L1 \leq 1.4\,[\mu H] \quad (20).$$

21. A magnetic head according to claim 20, characterized in that the inductance L1 [µH] at 10 MHz, and the RF resistance Rp1 [Ω] at 20 MHz and the DC resistance Rs [Ω] satisfy inequalities (21) and (27):

$$Rp1 \geq L1 \times 1200 \quad (21)$$

$$Rs \leq 6\,[\Omega] \quad (27).$$

22. A magnetic head according to claim 21, characterized in that the inductance L1 [µH] at 10 MHz, and the RF resistance Rp1 [Ω] at 20 MHz satisfy inequality (22):

$$Rp1 \geq L1 \times 1500 \quad (22).$$

23. A magnetic head according to any one of claims 20 to 22, characterized in that at least one of the coil patterns is formed on a lower surface side of the coil facing a magneto-optical recording medium, and an interval Tb [µm] between the coil patterns, an interval Tc [µm] between an end face of the coil pattern formed on the lower surface side and a lower surface of the coil, and a thickness T [µm] of the coil satisfy inequalities (32), (33), and (34):

$$2\,[\mu m] \leq Tb \leq 70\,[\mu m] \quad (32)$$

$$Tc \leq 1.5H \quad (33)$$

$$30\,[\mu m] \leq T \leq 300\,[\mu m] \quad (34).$$

24. A magnetic head according to any one of claims 20 to 22, characterized in that a total number N of turns of the coil patterns, a minimum radius r1 [mm] of an innermost periphery of the coil pattern, and a maximum radius r2 [mm] of an outermost periphery satisfy inequalities (35), (36), and (37):

$$20 \leq N \leq 70 \tag{35}$$

$$r1 \leq 0.13 \text{ [mm]} \tag{36}$$

$$r2 \leq 1.0 \text{ [mm]} \tag{37}.$$

25. A magnetic head according to any one of claims 20 to 22, characterized in that the magnetic head has a sliding surface for sliding on a magneto-optical recording medium or a floating surface for floating and gliding, and an interval d [μm] between a lower surface of the coil facing the magneto-optical recording medium and a lowest point of the sliding surface or the floating surface satisfies inequality (38):

$$d \leq 100 \text{ [μm]} \tag{38}.$$

26. A magnetic head according to any one of claims 14 to 16, characterized in that a self-resonance frequency fr1 [MHZ] which maximizes an impedance magnitude |Z1| of the coil, and the inductance L1 [μH] at 10 MHz satisfy inequality (4):

$$fr1 \geq 1/2\pi\sqrt{L1 \times 1.4 \times 10^{-6}} \tag{4}.$$

27. A magnetic head according to any one of claims 14 to 16, characterized in that two to four coil patterns are formed.

28. A magnetic head according to any one of claims 14 to 16, characterized in that pitch P [μm] and the width W [μm] on the coil pattern satisfy inequality (12):

$$0.55 \leq W/P \leq 0.8 \tag{12}.$$

29. A magnetic head according to any one of claims 20 to 22, characterized by further comprising a lens.

30. A magneto-optical recording apparatus having an optical head for irradiating a magneto-optical recording medium with light, and a magnetic head for applying a magnetic field modulated by an information signal to the magneto-optical recording medium, characterized in that the magnetic head is the magnetic head defined in any one of claims 14 to 16 and 20 to 22.

31. A magneto head coil according to any one of claims 6 to 8, characterized in that when at least a core made of a magnetic material is not attached, a self-resonance frequency fr0 [MHz] which maximizes an impedance magnitude |Z0| of the coil, and the inductance L0 [μH] at 10 MHz satisfy inequality (9):

$$fr0 \geq 1/2\pi\sqrt{L0 \times 1.4 \times 10^{-6}} \tag{9}.$$

32. A magnetic head coil according to any one of claims 6 to 8, characterized in that two to four coil patterns are formed.

33. A magnetic head coil according to any one of claims 6 to 8, characterized in that the pitch P [μm] and the width W [μ] on the coil pattern satisfy inequality (12):

$$0.55 \leq W/P \leq 0.8 \tag{12}.$$

34. A magnetic head according to any one of claims 20 to 22, characterized in that self-resonance frequency fr1 [MH] which maximizes an impedance magnitude |Z1| of the coil, and the inductance L1 [μH] at 10 MHz satisfy inequality (4):

$$fr1 \geq 1/2\pi\sqrt{L1 \times 1.4 \times 10^{-6}} \tag{4}.$$

35. A magnetic head according to any one of claims 20 to 22, characterized in that two to four coil patterns are formed.

36. A magnetic head according to any one of claims 20 to 22, characterized in that the pitch P [μm] and the width W [μm] on the coil pattern satisfy inequality (12):

$$0.55 \leq W/P \leq 0.8 \tag{12}.$$

37. A magneto-optical recording apparatus including:

an optical head for irradiating a magneto-optical recording medium with light; and a magnetic head having a flat coil, characterized in that the coil is constituted by spiral coil patterns made of a conductive material film and two terminals connected to the coil patterns, a light-transmitting portion is formed at a center of the coil, the coil patterns have a substantially rectangular sectional shape, a minimum pitch P [μm] of the coil pattern, a width W [μm] of the sectional shape at the minimum pitch P, and a height H [,um] satisfy inequalities (29) and (30):

$$15 \text{ [μm]} \leq P \leq 50 \text{ [μm]} \tag{29}$$

$$1.85 - 0.012P \leq H/W \leq 7.5 - 0.06P \tag{30}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (20):

$$L1 \leq 1.4 \text{ [μH]} \tag{20}$$

wherein the magnetic head applies a magnetic field modulated by an information signal to the magneto-optical recording medium.

38. A magneto-optical recording apparatus including:

an optical head for irradiating a magneto-optical recording medium with light; and a magnetic head having a flat coil, characterized in that the coil is constituted by spiral coil patterns made of a conductive material film and two terminals connected to the coil patterns, a light-transmitting portion is formed at a center of the coil, the coil patterns have a substantially rectangular sectional shape, a minimum pitch P [μm] of the coil pattern, a width W [μm] of the sectional shape at the minimum pitch P, and a height H [,um] satisfy inequalities (29) and (30):

$$15 \text{ [μm]} \leq P \leq 50 \text{ [μm]} \tag{29}$$

$$1.85 - 0.012P \leq H/W \leq 7.5 - 0.06P \tag{30}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (20):

$$L1 \leq 1.4 \text{ [μH]} \tag{20}$$

the inductance L1 [μH] at 10 MHz, and the RF resistance Rp1 [Ω] at 20 MHz and the DC resistance Rs [Ω] satisfy inequalities (21) and (27):

$$Rp1 \geq L1 \times 1200 \tag{21}$$

$$Rs \leq 6[\Omega], \tag{27}$$

wherein the magnetic head applies a magnetic field modulated by an information signal to the magneto-optical recording medium.

39. A magneto-optical recording apparatus including:

an optical head for irradiating a magneto-optical recording medium with light; and a magnetic head having a flat coil, characterized in that the coil is constituted by spiral coil patterns made of a conductive material film and two terminals connected to the coil patterns, a light-transmitting portion is formed at a center of the coil, the coil patterns have a substantially rectangular sectional shape, a minimum pitch P [μm] of the coil pattern, a width W [μm] of the sectional shape at the minimum pitch P, and a height H [μm] satisfy inequalities (29) and (30):

$$15\ [\mu m] \leq P \leq 50\ [\mu m] \tag{29}$$

$$1.85 - 0.012P \leq H/W \leq 7.5 - 0.06P \tag{30}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (20):

$$L1 \leq 1.4\ [\mu H], \tag{20}$$

the inductance L1 [μH] at 10 MHz, and the RF resistance Rp1 [Ω] at 20 MHz and the DC resistance Rs [Ω] satisfy inequalities (21) and (27):

$$Rp1 \geq L1 \times 1200 \tag{21}$$

$$Rs \leq 6[\Omega] \tag{27}$$

the inductance L1 [μH] at 10 MHz, and the RF resistance Rp1 [Ω] at 20 MHz satisfy inequality (22):

$$Rp1 \geq L1 \times 1500 \tag{22}$$

wherein the magnetic head applies a magnetic field modulated by an information signal to the magneto-optical recording medium.

40. A magneto-optical recording apparatus including:

an optical head for irradiating a magneto-optical recording medium with light; and a magnetic head having a core made of a magnetic material and a flat coil, characterized in that the coil is constituted by spiral coil patterns made of a conductive material film and two terminals connected to the coil patterns, the coil patterns have a substantially rectangular sectional shape, a minimum pitch P [μm] of the coil pattern, a width W [μm] of the sectional shape at the minimum pitch P, and a height H [μm] satisfy inequalities (10) and (11):

$$15\ [\mu m] \leq P \leq 70\ [\mu m] \tag{10}$$

$$1.85 - 0.012P \leq H/W \leq 7.5 - 0.06P \tag{11}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (1):

$$L1 \leq 1.4\ [\mu H], \tag{1}$$

the inductance L1 [μH] at 10 MHz, and the RF resistance Rp1 [Ω] at 20 MHz and the DC resistance Rs [Ω] satisfy inequalities (2) and (8):

$$Rp1 \geq L1 \times 1500 \tag{2}$$

$$Rs \leq 2[\Omega], \tag{8}$$

wherein the magnetic head applies a magnetic field modulated by an information signal to the magneto-optical recording medium.

41. A magneto-optical recording apparatus including:

an optical head for irradiating a magneto-optical recording medium with light; and a magnetic head having a core made of a magnetic material and a flat coil, characterized in that the coil is constituted by spiral coil patterns made of a conductive material film and two terminals connected to the coil patterns, the coil patterns have a substantially rectangular sectional shape, a minimum pitch P [μm] of the coil pattern, a width W [μm] of the sectional shape at the minimum pitch P, and a height H [μm] satisfy inequalities (10) and (11):

$$15\ [\mu m] \leq P \leq 70\ [\mu m] \tag{10}$$

$$1.85 - 0.012P \leq H/W \leq 7.5 - 0.06P \tag{11}$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 [μH] at 10 MHz satisfies inequality (1):

$$L1 \leq 1.4\ [\mu H], \tag{1}$$

the inductance L1 [μH] at 10 MHz, and the RF resistance Rp1 [Ω] at 20 MHz and the DC resistance Rs [Ω] satisfy inequalities (2) and (8):

$$Rp1 \geq L1 \times 1500 \tag{2}$$

$$Rs \leq 2[\Omega] \tag{8}$$

and the inductance L1 [μH] at 10 MHz, and the RF resistance Rp1 [Ω] at 20 MHz satisfy inequality (3):

$$Rp1 \geq L1 \times 2000, \tag{3}$$

wherein the magnetic head applies a magnetic field modulated by an information signal to the magneto-optical recording medium.

* * * * *

UNITED STATES PATENT AND TRADEMARK OFFICE
CERTIFICATE OF CORRECTION

PATENT NO. : 6,529,448 B1
DATED : March 4, 2003
INVENTOR(S) : Kazuyoshi Ishii et al.

It is certified that error appears in the above-identified patent and that said Letters Patent is hereby corrected as shown below:

Title page,
Item [57], ABSTRACT,
Line 7, "$1.8-0.012P \leq H/W \leq 7.5-0.06P.$" should read -- $1.85-0.012P \leq H/W \leq 7.5-0.06P.$ --.

Column 3,
Line 33, "20, MHz" should read -- 20 MHz --.

Column 7,
Line 25, "the,magneto-optical" should read -- the magneto-optical --.

Column 20,
Line 28, "$1.85-0.012P \leq H/W \leq 7.25-0.06P$" should read -- $1.85-0.012P \leq H/W \leq 7.5-0.06P$ --.

Column 21,
Line 40, "$1.15pH,$" should read -- $1.15\mu H,$ --.

Column 23,
Line 55, "the;" should read -- the --.

Column 27,
Line 6, "( 9):" should read -- (9): --.
Line 8, "$fr0 \geq 1/(2\pi\sqrt{L0 \times 1.4 \times 10^{-6}})$" should read -- $fr0 \geq 1/(2\pi\sqrt{L0 \times 1.4 \times 10^{-6}})$ --.

Column 29,
Line 24, "[MHZ]" should read -- [MHz] --.
Line 28, "$fr1 \geq /2\pi\sqrt{L1 \times 1.4 \times 10^{-6}})$" should read -- $fr1 \geq /(2\pi\sqrt{L1 \times 1.4 \times 10^{-6}})$ --.

Line 40, "30. A magneto-optical recording apparatus having an optical head for irradiating a magneto-optical recording medium with light, and a magnetic head for applying a magnetic field modulated by an information signal to the magneto-optical recording medium, characterized in that the magnetic head is the magnetic head defined in any one of claims 14 to 16 and 20 to 22." should read:
-- 30.   A magneto-optical recording apparatus including:
           an optical head for irradiating a magneto-optical recording medium with light; and
           a magnetic head having a core made of a magnetic material and a flat coil, characterized in that the coil is constituted by spiral coil patterns made of a conductive material film and two terminals connected to the coil patterns, the coil patterns have a substantially rectangular sectional shape, a minimum pitch P [$\mu$m] of the coil pattern, a width W [$\mu$m] of the sectional shape at the minimum pitch P, and a

UNITED STATES PATENT AND TRADEMARK OFFICE
CERTIFICATE OF CORRECTION

PATENT NO. : 6,529,448 B1
DATED : March 4, 2003
INVENTOR(S) : Kazuyoshi Ishii et al.

It is certified that error appears in the above-identified patent and that said Letters Patent is hereby corrected as shown below:

Column 29 (cont'd),
inequalities (10) and (11):

$$15 \ [\mu m] \leq P \leq 70 \ [\mu m] \qquad \ldots (10)$$
$$1.85 - 0.012P \leq H/W \leq 7.5 - 0.06P \qquad \ldots (11)$$

when an impedance Z1 between the two terminals of the coil is regarded to be equivalently constituted by an inductance L1, an RF resistance Rp1 parallel to the inductance L1, and a DC resistance Rs which is series-connected to the inductance L1 and is independent of a frequency, the inductance L1 $[\mu H]$ at 10 MHz satisfies inequality (1):

$$L1 \leq 1.4 \ [\mu H], \qquad \ldots (1)$$

wherein the magnetic head applies a magnetic field modulated by an information signal to the magneto-optical recording medium. --.
Line 46, "magneto" should read -- magnetic --.
Line 54, "$fr0 \geq 1/2\pi\sqrt{L0 \times 1.4 \times 10^{-6}})$" should read --$fr0 \geq 1/(2\pi\sqrt{L0 \times 1.4 \times 10^{-6}})$--.

Line 65, "[MH]" should read -- [MHz] --.

Column 30,
Line 1, "$fr1 \geq /2\pi\sqrt{L1 \times 1.4 \times 10^{-6}})$" should read --$fr1 \geq /(2\pi\sqrt{L1 \times 1.4 \times 10^{-6}})$--.

Line 21, "[,um]" should read -- [μm] --.
Line 50, "[,um]" should read -- [μm] --.

Column 31,
Line 19, "[,um]" should read -- [μm] --.

Signed and Sealed this

Thirtieth Day of December, 2003

JAMES E. ROGAN
*Director of the United States Patent and Trademark Office*